United States Patent
Hirzallah et al.

(10) Patent No.: US 12,140,689 B2
(45) Date of Patent: *Nov. 12, 2024

(54) NETWORK-BASED SIDELINK-AWARE RADIO FREQUENCY FINGERPRINTING (RFFP) POSITIONING

(71) Applicant: QUALCOMM Incorporated, San Diego, CA (US)

(72) Inventors: Mohammed Ali Mohammed Hirzallah, San Diego, CA (US); Taesang Yoo, San Diego, CA (US); Srinivas Yerramalli, San Diego, CA (US); Rajat Prakash, San Diego, CA (US); Xiaoxia Zhang, San Diego, CA (US); Marwen Zorgui, San Diego, CA (US); Roohollah Amiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

This patent is subject to a terminal disclaimer.

(21) Appl. No.: 17/648,218

(22) Filed: Jan. 18, 2022

(65) Prior Publication Data
US 2023/0228835 A1   Jul. 20, 2023

(51) Int. Cl.
*G01S 5/02*   (2010.01)
*G06N 3/08*   (2023.01)
(Continued)

(52) U.S. Cl.
CPC ............ *G01S 5/02521* (2020.05); *G06N 3/08* (2013.01); *H04W 24/10* (2013.01); *H04W 64/00* (2013.01)

(58) Field of Classification Search
CPC ..... G01S 5/02521; G06N 3/08; H04W 24/10; H04W 64/00
See application file for complete search history.

(56) References Cited

U.S. PATENT DOCUMENTS

| 9,743,254 | B2 * | 8/2017 | Friday | H04B 17/318 |
| 2011/0306345 | A1 * | 12/2011 | Wu | H04W 24/10 |
| | | | | 455/466 |

(Continued)

FOREIGN PATENT DOCUMENTS

| EP | 4024994 A1 | 7/2022 |
| WO | 2019240771 A1 | 12/2019 |

(Continued)

OTHER PUBLICATIONS

International Search Report and Written Opinion—PCT/US2022/080592—ISA/EPO—Mar. 24, 2023.

*Primary Examiner* — Bailor C Hsu
(74) *Attorney, Agent, or Firm* — Muncy, Geissler, Olds & Lowe, P.C./Qualcomm

(57) ABSTRACT

Disclosed are techniques for positioning. In an aspect, a network entity receives, from at least one network node, a measurement report including one or more radio frequency fingerprint (RFFP) measurements, wherein the one or more RFFP measurements include at least one RFFP measurement of at least one sidelink channel between a first user equipment (UE) and a second UE, determines one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

30 Claims, 18 Drawing Sheets

(51) Int. Cl.
*H04W 24/10* (2009.01)
*H04W 64/00* (2009.01)

(56) References Cited

U.S. PATENT DOCUMENTS

| | | | |
|---|---|---|---|
| 2017/0142684 A1* | 5/2017 | Bhatt | G01S 5/02521 |
| 2019/0230618 A1* | 7/2019 | Saur | H04W 56/001 |
| 2021/0045093 A1* | 2/2021 | Rao | H04W 76/14 |
| 2021/0136527 A1* | 5/2021 | Tadayon | G01S 5/0289 |
| 2021/0160712 A1* | 5/2021 | Tadayon | H04W 36/16 |
| 2021/0160812 A1* | 5/2021 | Manolakos | H04W 64/00 |
| 2021/0235226 A1* | 7/2021 | Nakagawa | H04W 4/023 |
| 2021/0243631 A1* | 8/2021 | Pezeshki | H04W 52/0258 |
| 2023/0037704 A1* | 2/2023 | Hirzallah | G06F 18/2155 |
| 2023/0098229 A1* | 3/2023 | Gurelli | G01S 5/0273 |
| | | | 455/456.1 |
| 2023/0232361 A1 | 7/2023 | Hirzallah et al. | |

FOREIGN PATENT DOCUMENTS

| | | |
|---|---|---|
| WO | 2021040489 A1 | 3/2021 |
| WO | 2021188220 A1 | 9/2021 |

\* cited by examiner

NETWORK-BASED SIDELINK-AWARE RADIO FREQUENCY FINGERPRINTING (RFFP) POSITIONING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of positioning performed by a network entity includes receiving, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and determining one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

In an aspect, a method of positioning performed by a network node includes receiving, from a network entity, a first measurement request for radio frequency fingerprint (RFFP) measurements; and transmitting, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

In an aspect, a network entity includes a memory; at least one transceiver; and at least one processor communicatively coupled to the memory and the at least one transceiver, the at least one processor configured to: receive, via the at least one transceiver, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and determine one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

In an aspect, a network node includes a memory; at least one transceiver; and at least one processor communicatively coupled to the memory and the at least one transceiver, the at least one processor configured to: receive, via the at least one transceiver, from a network entity, a first measurement request for radio frequency fingerprint (RFFP) measurements; and transmit, via the at least one transceiver, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

In an aspect, a network entity includes means for receiving, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and means for determining one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

In an aspect, a network node includes means for receiving, from a network entity, a first measurement request for radio frequency fingerprint (RFFP) measurements; and means for transmitting, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

In an aspect, a non-transitory computer-readable medium storing computer-executable instructions that, when executed by a network entity, cause the network entity to: receive, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and determine one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

In an aspect, a non-transitory computer-readable medium storing computer-executable instructions that, when executed by a network node, cause the network node to: receive, from a network entity, a first measurement request for radio frequency fingerprint (RFFP) measurements; and transmit, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
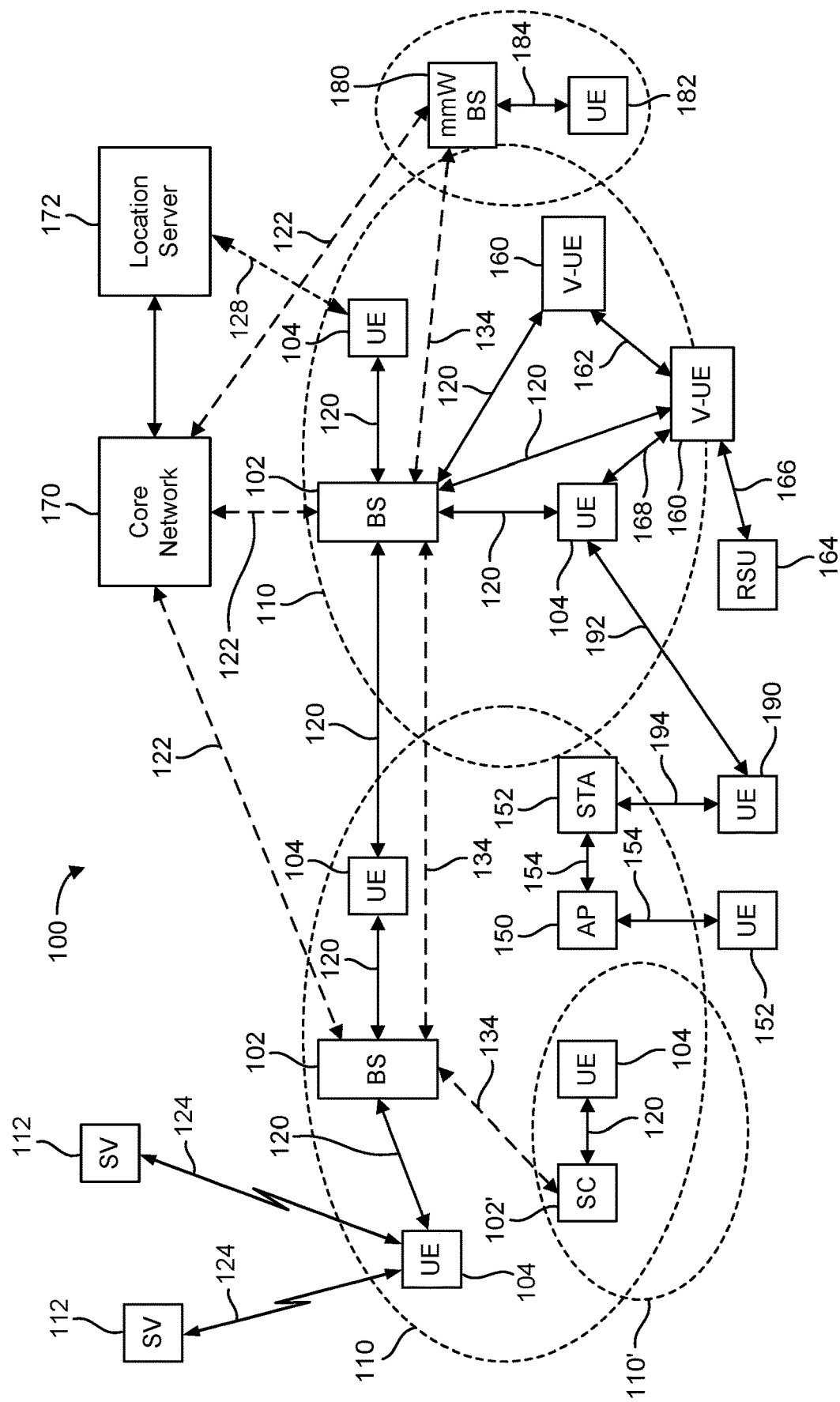
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a oneway or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
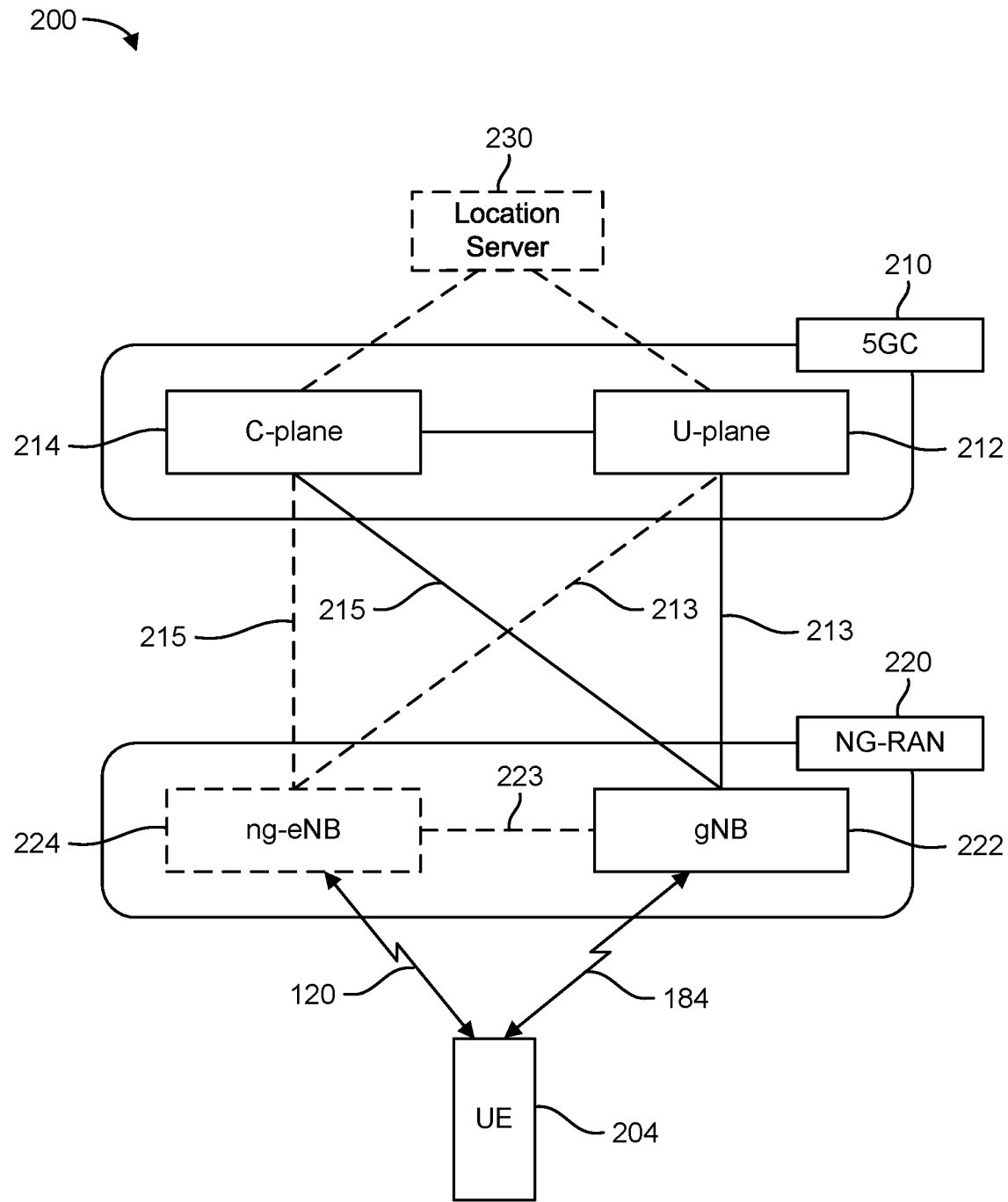
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
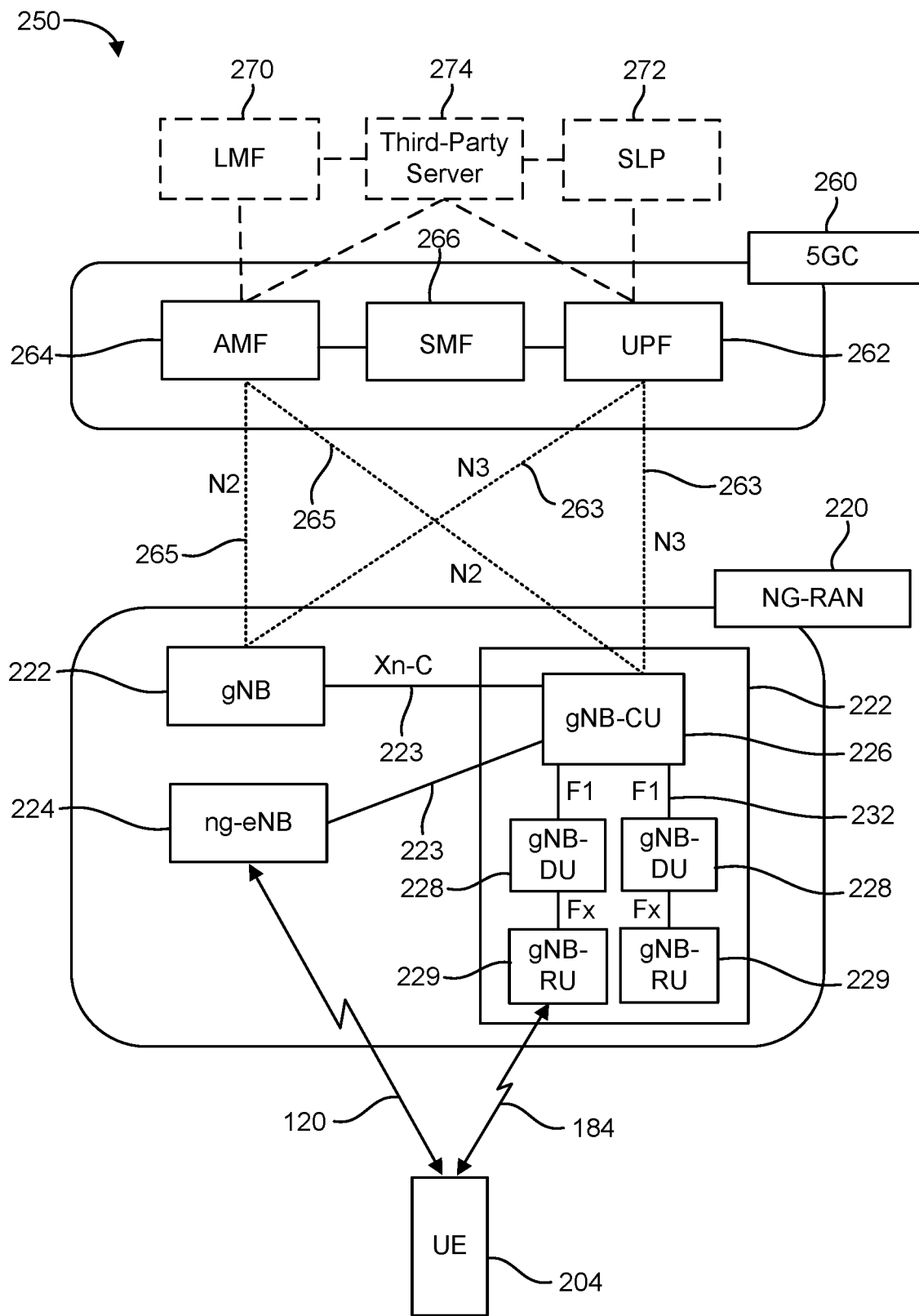

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
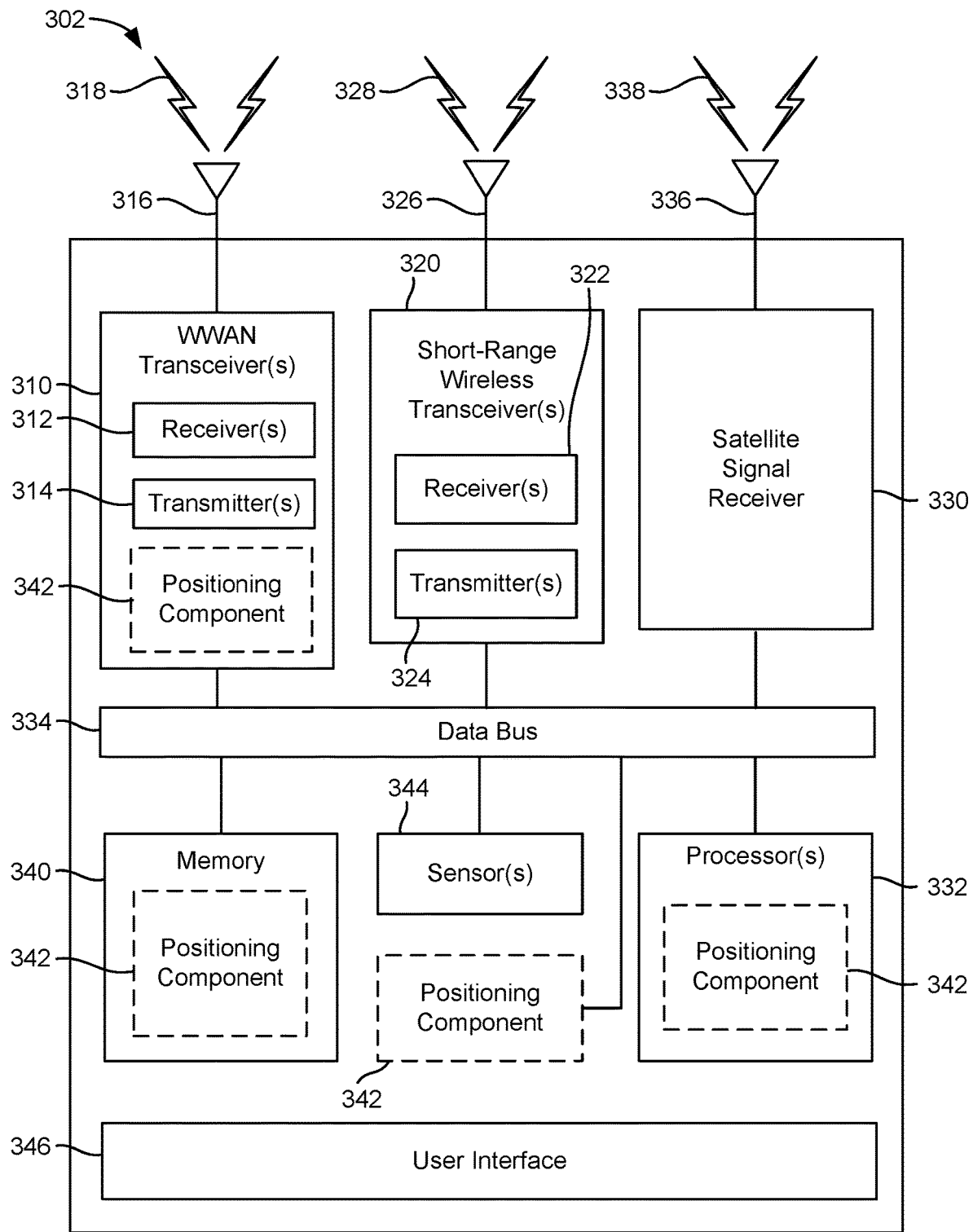
FIGS. 3A, 3B, and 3C are simplified block diagrams of several sample aspects of components that may be employed in a user equipment (UE), a base station, and a network entity, respectively, and configured to support communications as taught herein.
Figure 3B:
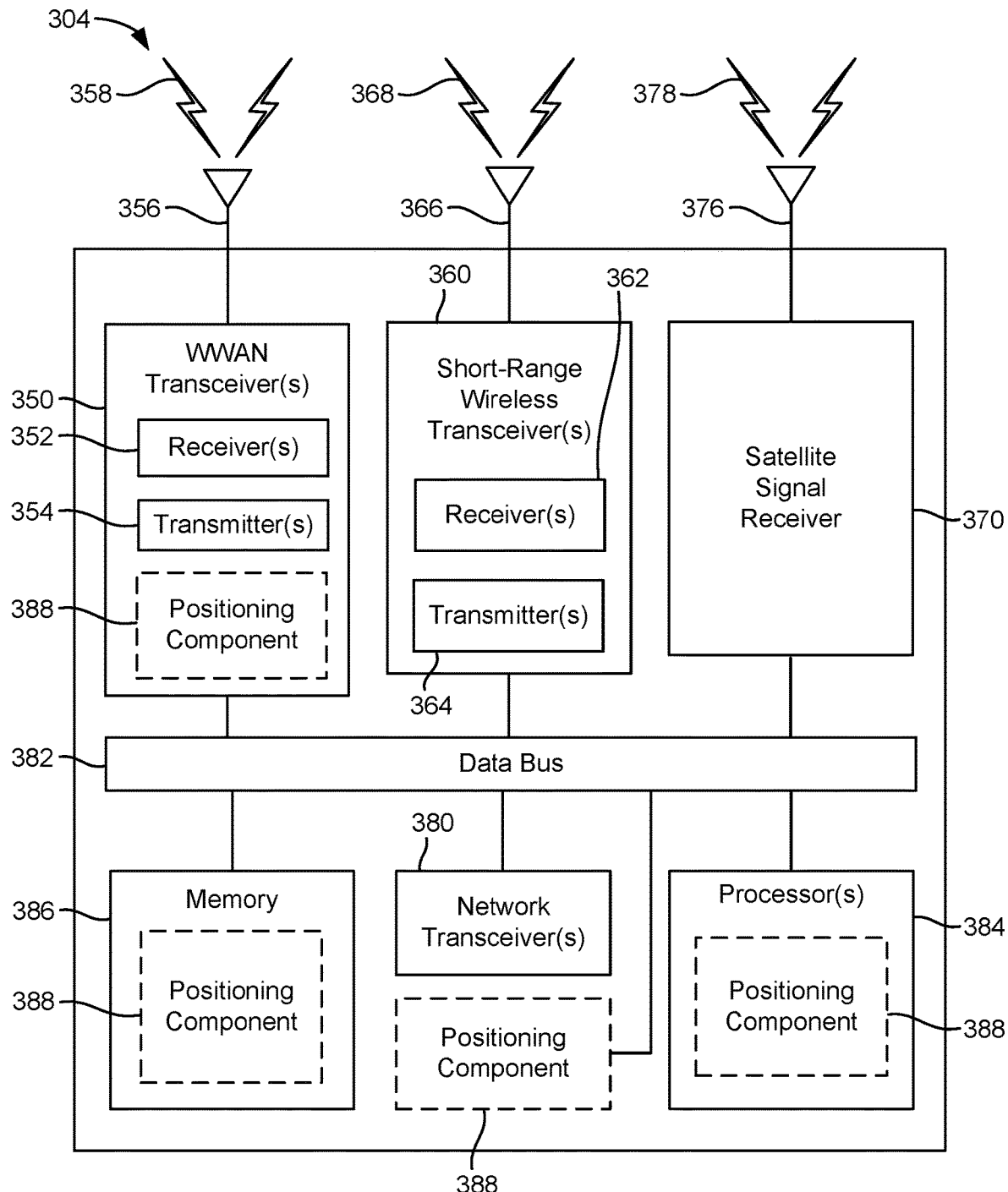
Figure 3C:
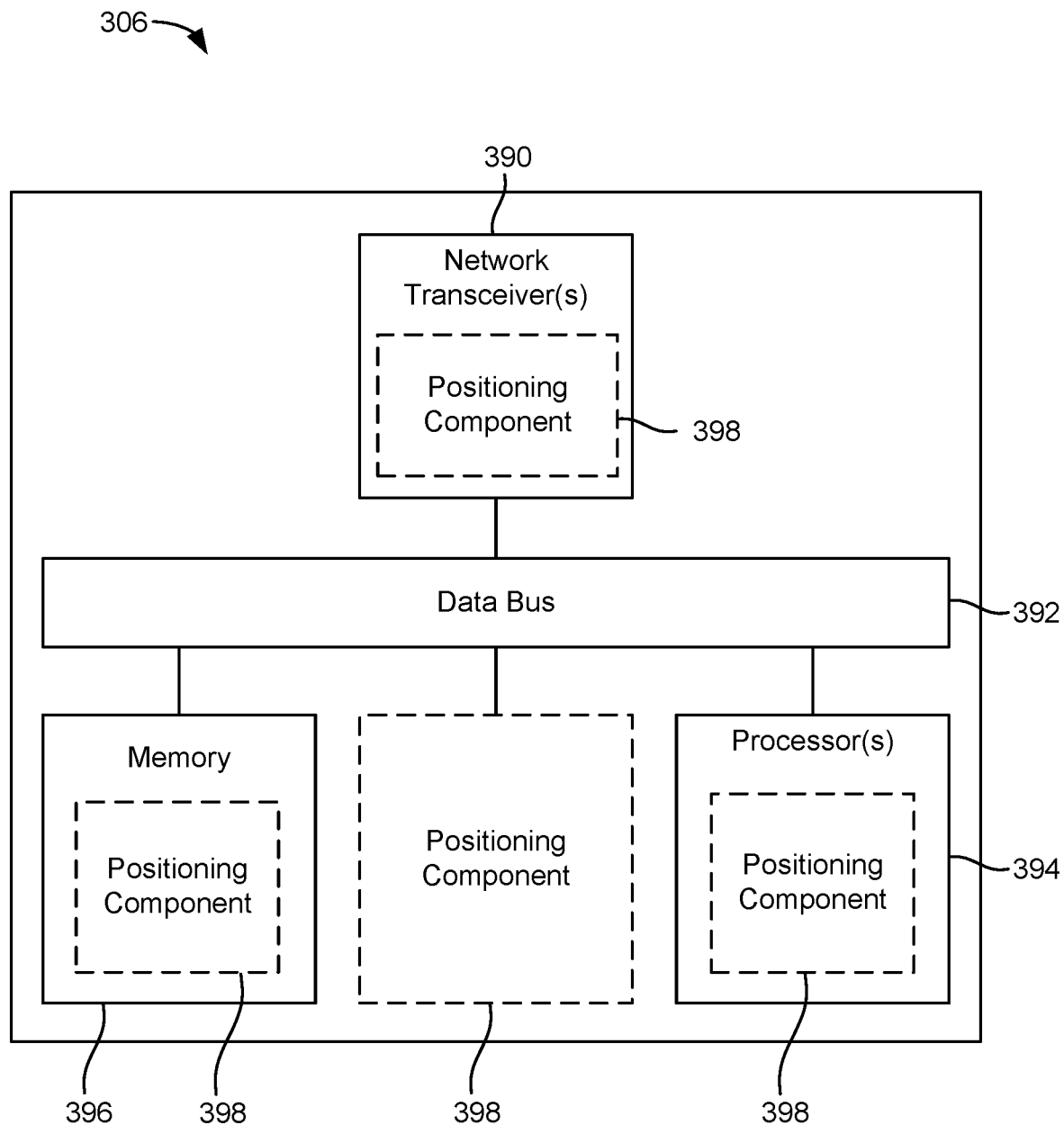

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
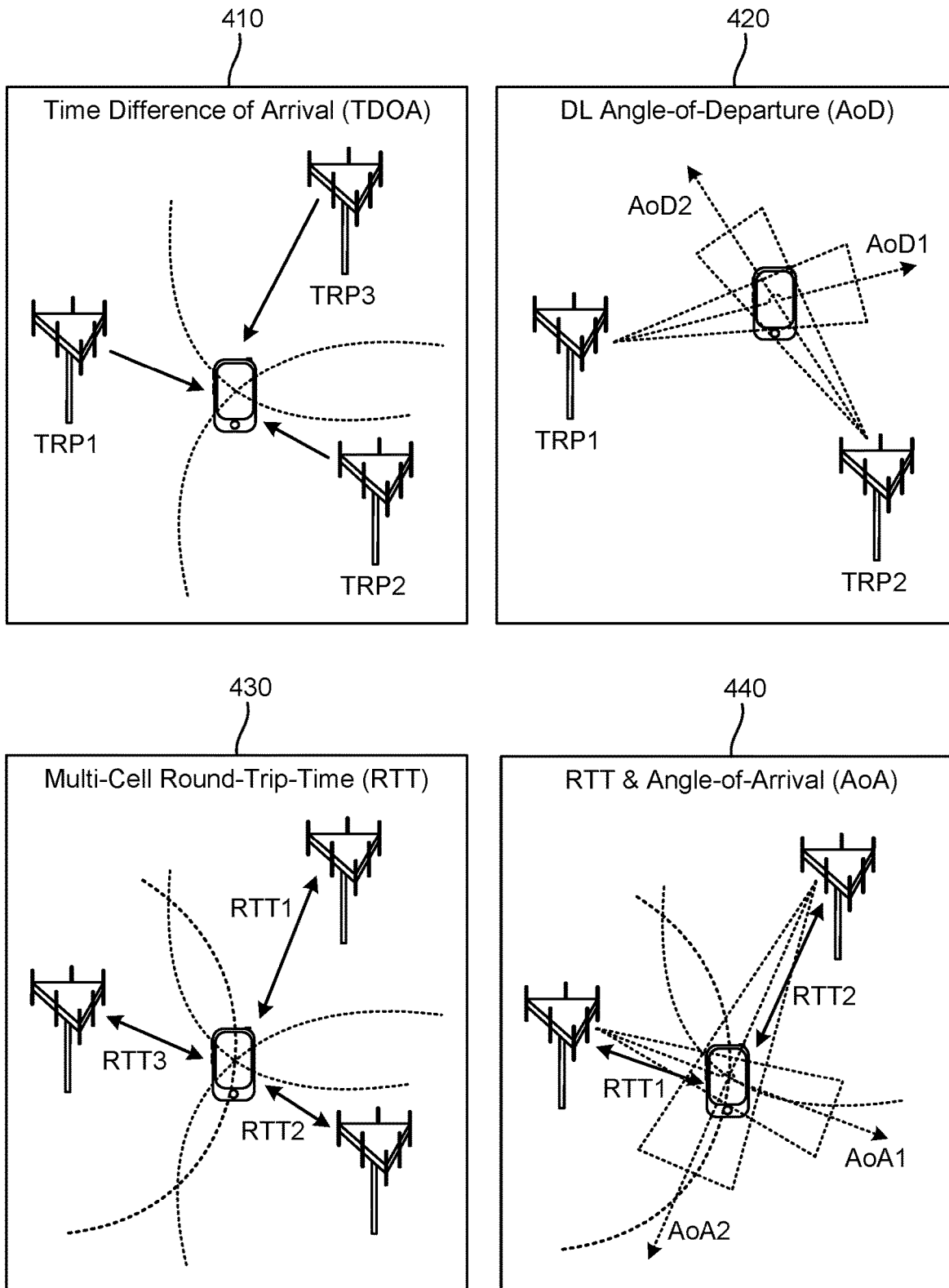
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5A:
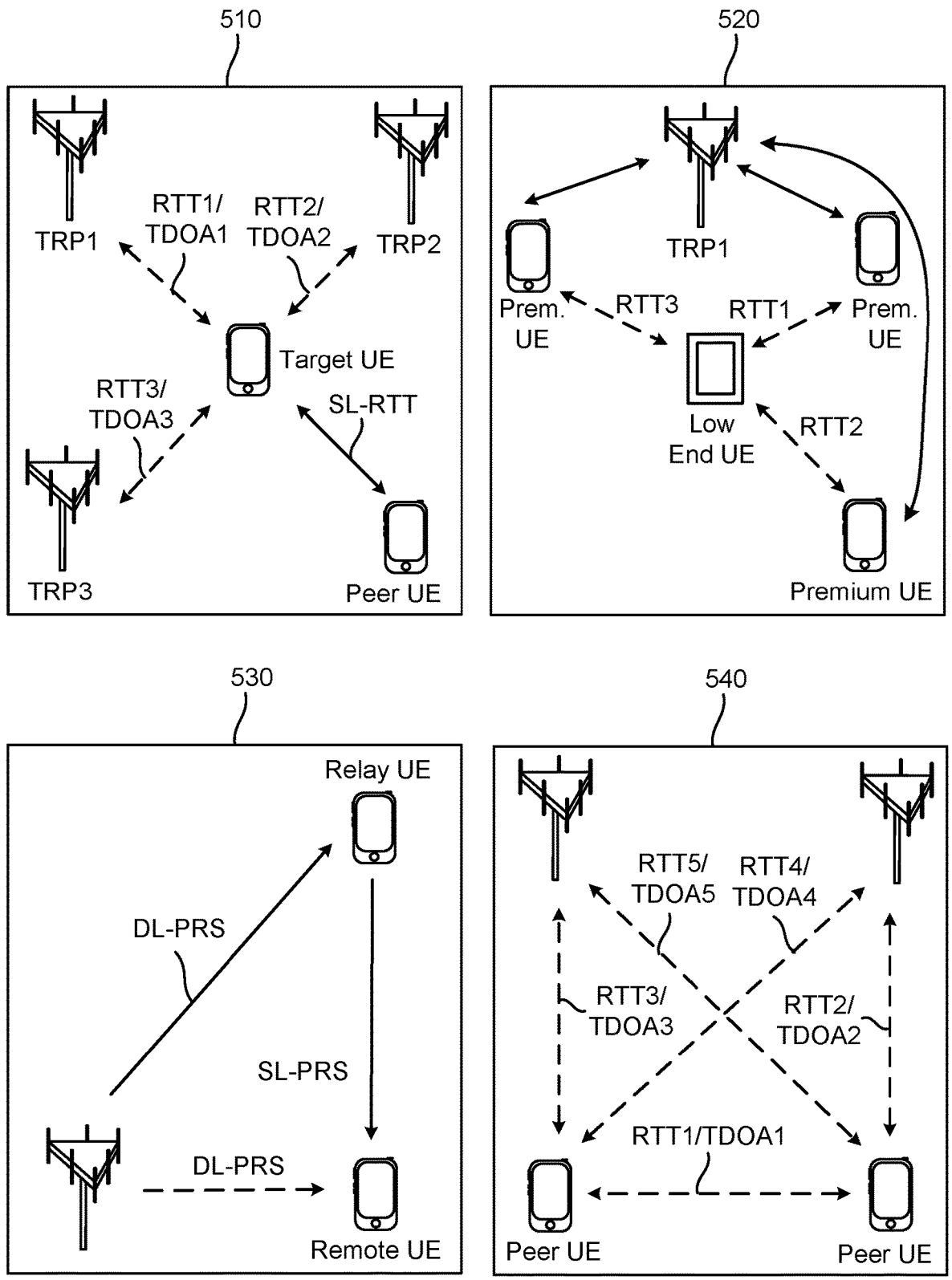
FIGS. 5A and 5B illustrate various scenarios of interest for sidelink-only or joint Uu and sidelink positioning, according to aspects of the disclosure.

NR supports, or enables, various sidelink positioning techniques. FIG. 5A illustrates various scenarios of interest for sidelink-only or joint Uu and sidelink positioning, according to aspects of the disclosure. In scenario 510, at least one peer UE with a known location can improve the Uu-based positioning (e.g., multi-cell round-trip-time (RTT), downlink time difference of arrival (DL-TDOA), etc.) of a target UE by providing an additional anchor (e.g., using sidelink RTT (SL-RTT)). In scenario 520, a low-end (e.g., reduced capacity, or "RedCap") target UE may obtain the assistance of premium UEs to determine its location using, e.g., sidelink positioning and ranging procedures with the premium UEs. Compared to the low-end UE, the premium UEs may have more capabilities, such as more sensors, a faster processor, more memory, more antenna elements, higher transmit power capability, access to additional frequency bands, or any combination thereof. In scenario 530, a relay UE (e.g., with a known location) participates in the positioning estimation of a remote UE without performing uplink positioning reference signal (PRS) transmission over the Uu interface. Scenario 540 illustrates the joint positioning of multiple UEs. Specifically, in scenario 540, two UEs with unknown positions can be jointly located in non-line-of-sight (NLOS) conditions by utilizing constraints from nearby UEs.

Figure 5B:
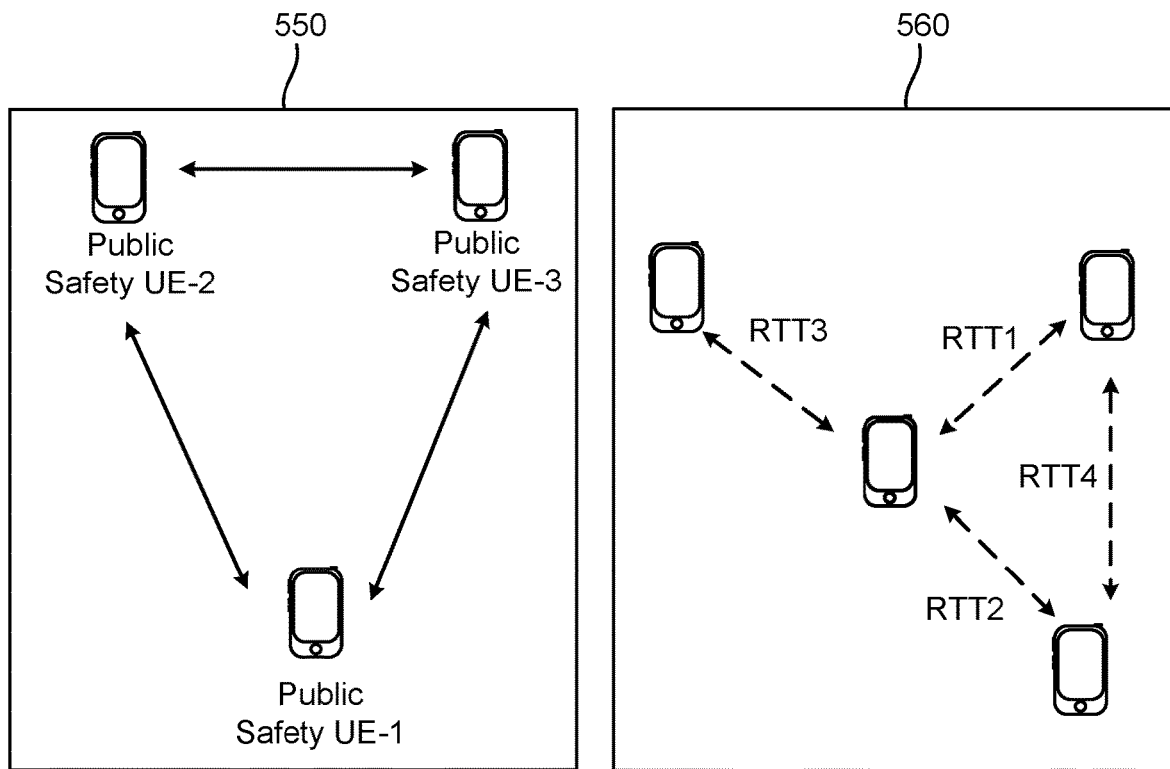

FIG. 5B illustrates additional scenarios of interest for sidelink-only or joint Uu and sidelink positioning, according to aspects of the disclosure. In scenario 550, UEs used for public safety (e.g., by police, firefighters, and/or the like) may perform peer-to-peer (P2P) positioning and ranging for public safety and other uses. For example, in scenario 550, the public safety UEs may be out of coverage of a network and determine a location or a relative distance and a relative position among the public safety UEs using sidelink positioning techniques. Similarly, scenario 560 shows multiple UEs that are out of coverage and determine a location or a relative distance and a relative position using sidelink positioning techniques, such as SL-RTT.

Figure 6:
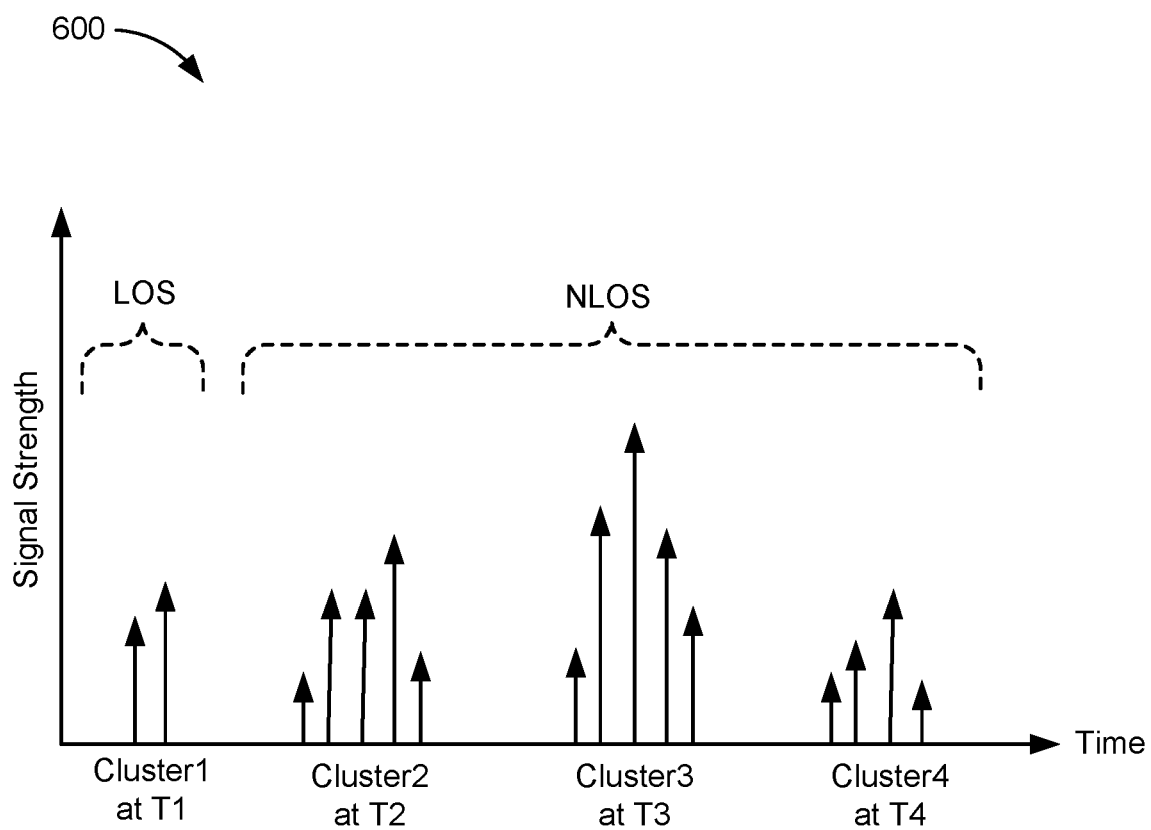
FIG. 6 is a graph representing a radio frequency (RF) channel impulse response over time, according to aspects of the disclosure.

FIG. 6 is a graph 600 representing the channel impulse response of a multipath channel between a receiver device (e.g., any of the UEs or base stations described herein) and a transmitter device (e.g., any other of the UEs or base stations described herein), according to aspects of the disclosure. The channel impulse response (CIR), also referred to as the channel energy response (CER), represents the intensity of a radio frequency (RF) signal received through a multipath channel as a function of time delay. Thus, the horizontal axis is in units of time (e.g., milliseconds) and the vertical axis is in units of signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 6, the receiver detects/measures multiple (four) clusters of channel taps. Each channel tap represents a multipath that an RF signal followed between the transmitter and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (e.g., potentially following different paths due to reflections), or both.

All of the clusters of channel taps for a given RF signal represent the multipath channel (or simply channel) between the transmitter and receiver. Under the channel illustrated in FIG. 6, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6, because the first cluster of RF signals at time T1 arrives first, it is assumed to correspond to the RF signal transmitted on the transmit beam aligned with the line-of-sight (LOS), or the shortest, path. The third cluster at time T3 is comprised of the strongest RF signals, and may correspond to, for example, the RF signal transmitted on a transmit beam aligned with a non-line-of-sight (NLOS) path. Note that although FIG. 6 illustrates clusters of two to five channel taps, as will be appreciated, the clusters may have more or fewer than the illustrated number of channel taps.

Machine learning may be used to generate models that may be used to facilitate various aspects associated with processing of data. One specific application of machine learning relates to generation of measurement models for processing of reference signals for positioning (e.g., PRS), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 7:
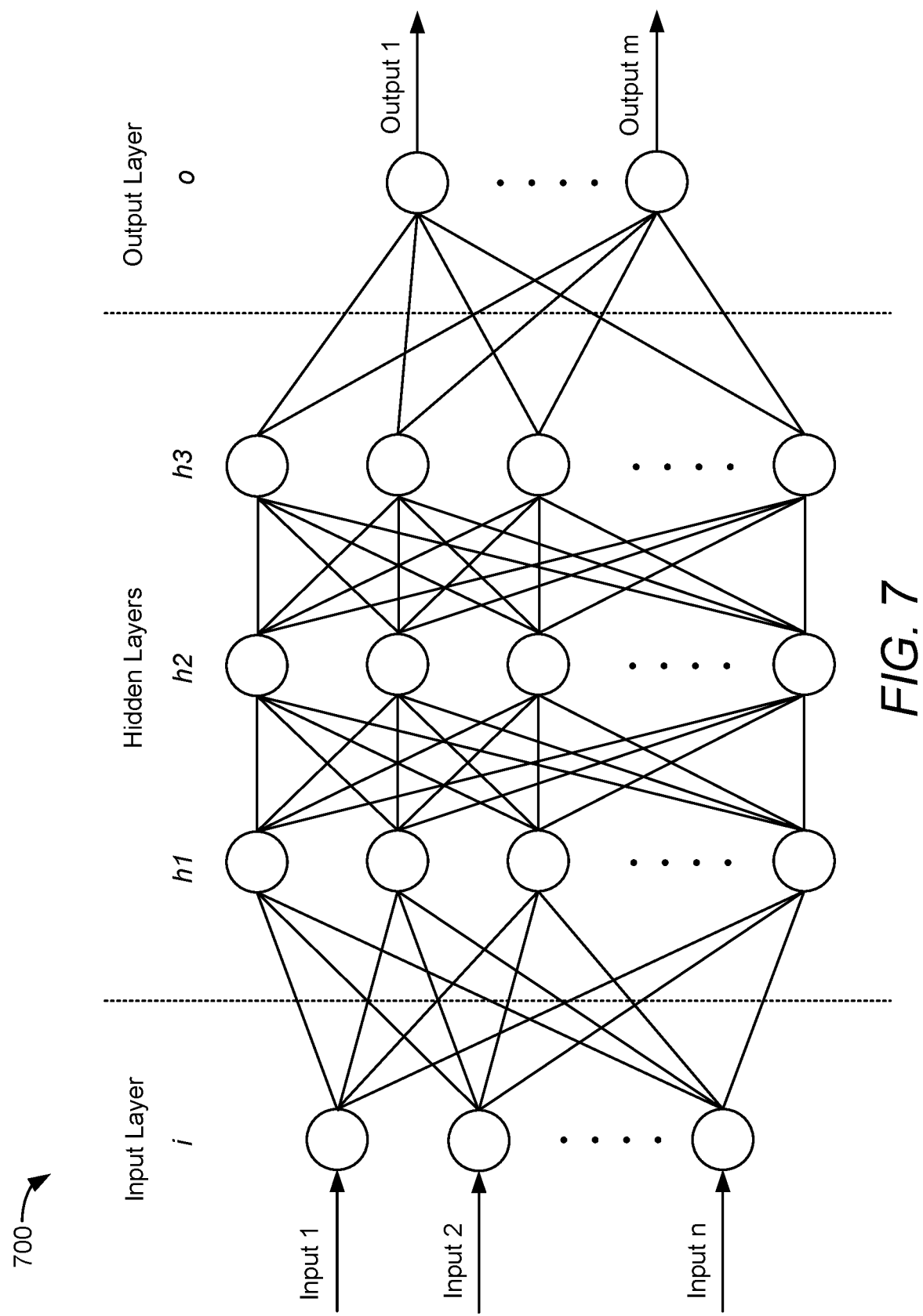
FIG. 7 illustrates an example neural network, according to aspects of the disclosure.

FIG. 7 illustrates an example neural network 700, according to aspects of the disclosure. The neural network 700 includes an input layer T that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system, such as processors 332, 384, or 394) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

NR supports RF fingerprinting (RFFP)-based positioning, a type of positioning and localization technique that utilizes RF fingerprints captured by mobile devices to determine the locations of the mobile devices. An RFFP may be a histogram of a received signal strength indicator (RSSI), a CER, a CIR, or a channel frequency response (CFR). An RFFP may represent a single channel received from a transmitter, all channels received from a particular transmitter, or all channels detectable at the receiver. The RFFP(s) measured by a mobile device (e.g., a UE) and the locations of the transmitter(s) associated with the measured RFFP(s) (i.e., the transmitters transmitting the RF signals measured by the mobile device to determine the RFFP(s)) can be used to determine (e.g., triangulate) the location of the mobile device.

In machine learning-RFFP-based positioning, RFFPs and their associated locations (i.e., the locations of the transmitters associated with the measured RFFPs) are used as features and labels, respectively, to train a machine learning model (e.g., neural network 700) in a supervised manner. After being trained, the machine learning model can be used to estimate the locations of mobile devices by processing RFFPs newly captured by the mobile devices.

The present disclosure provides techniques for employing machine learning-based RFFP-based positioning in scenarios that involve sidelink communications. More specifically, RFFP-based positioning can be extended to utilize radio features (e.g., CERs/CIRs) captured from sidelink communications, rather than only from uplink and downlink communications. The present disclosure focuses primarily on sidelink-aware RFFP-based positioning within a network-based positioning context, in which the inference and positioning takes place on the network side. Training of the sidelink-aware RFFP positioning module, however, can be applied by the network side and/or the mobile device side.

Figure 8:
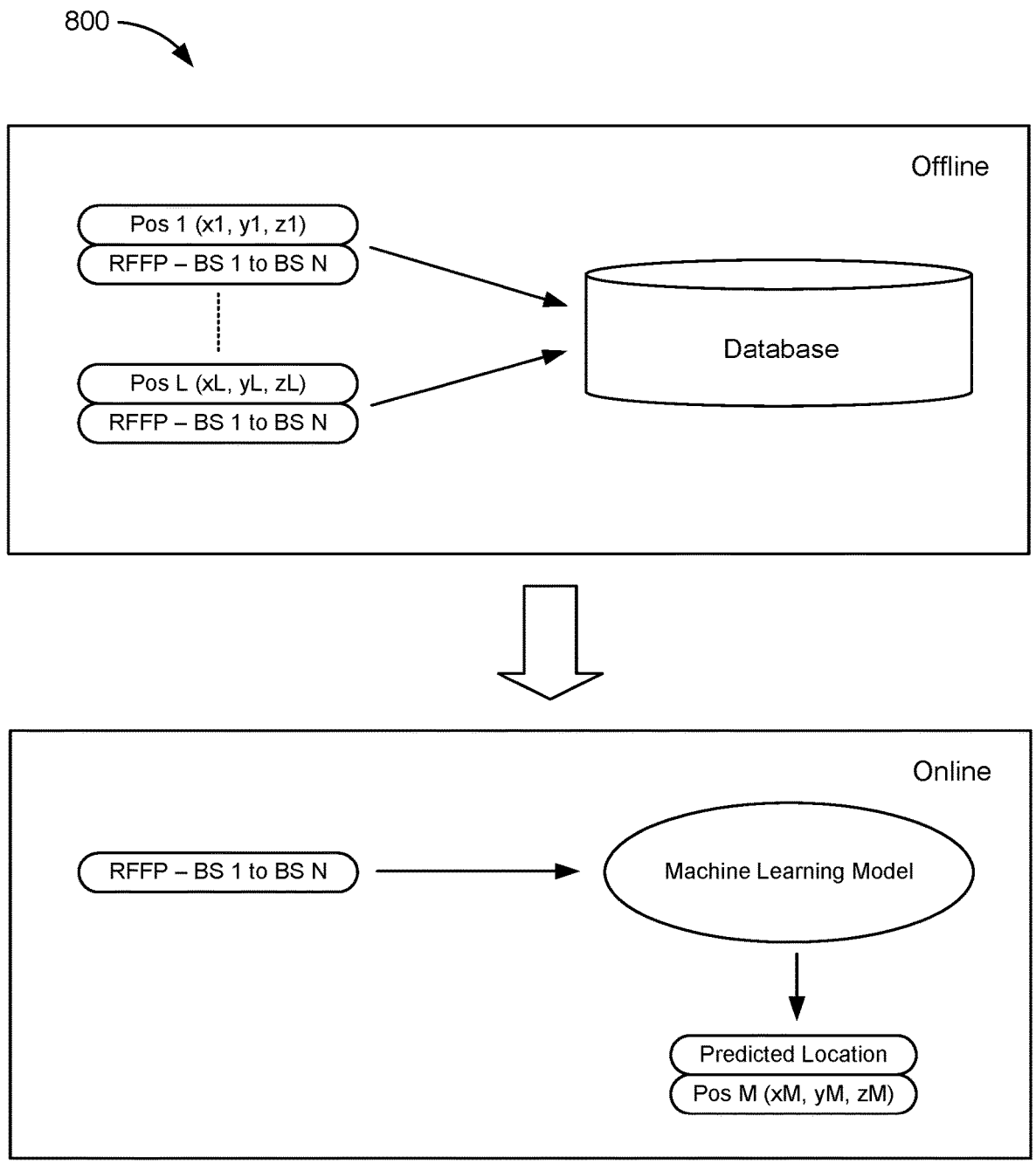
FIG. 8 is a diagram illustrating the use of a machine learning model for RF fingerprinting (RFFP)-based positioning, according to aspects of the disclosure.

FIG. 8 is a diagram 800 illustrating the use of a machine learning model for RFFP-based positioning, according to aspects of the disclosure. In the example of FIG. 8, during an "offline" stage, RFFPs (e.g., CERs/CIRs/CFRs) captured by a mobile device are stored in a database. The database may be located at the mobile device or a network entity (e.g., a location server). Each RFFP may include measurements of RF signals (or channels or links) transmitted by one or more transmitters, illustrated in FIG. 8 as base stations 1 to N (i.e., "BS 1" to "BS N"). That is, an RFFP may comprise the CER(s)/CIR(s)/CFR(s) of all RF signals (or channels or links) detected by a mobile device at a particular location, regardless of how many transmitters there are, or each RFFP may be associated with one transmitter. Each measured RFFP is also associated with the known location of the mobile device at the time it measured the RFFP, illustrated in FIG. 8 as positions 1 to L (i.e., "Pos 1" to "Pos L"). The mobile device's location may be known via another positioning technique, such as discussed above with reference to FIGS. 4 to 5B. Note that although FIG. 8 illustrates RFFP information for a single mobile device, as will be appreciated, RFFP information for multiple mobile devices can be collected and stored in the database.

Based on the information captured during the offline stage, a machine learning model (e.g., neural network 700) is trained to predict the locations of mobile devices based on RFFPs measured by the mobile devices. More specifically, the RFFPs are used as features and the associated locations of the mobile devices when capturing the RFFPs are used as labels. Then, during an "online" stage, the trained machine learning model can be used to predict (infer) the location of a mobile device (illustrated as "Pos M") based on the RFFP(s) currently measured by the mobile device.

Figure 9:
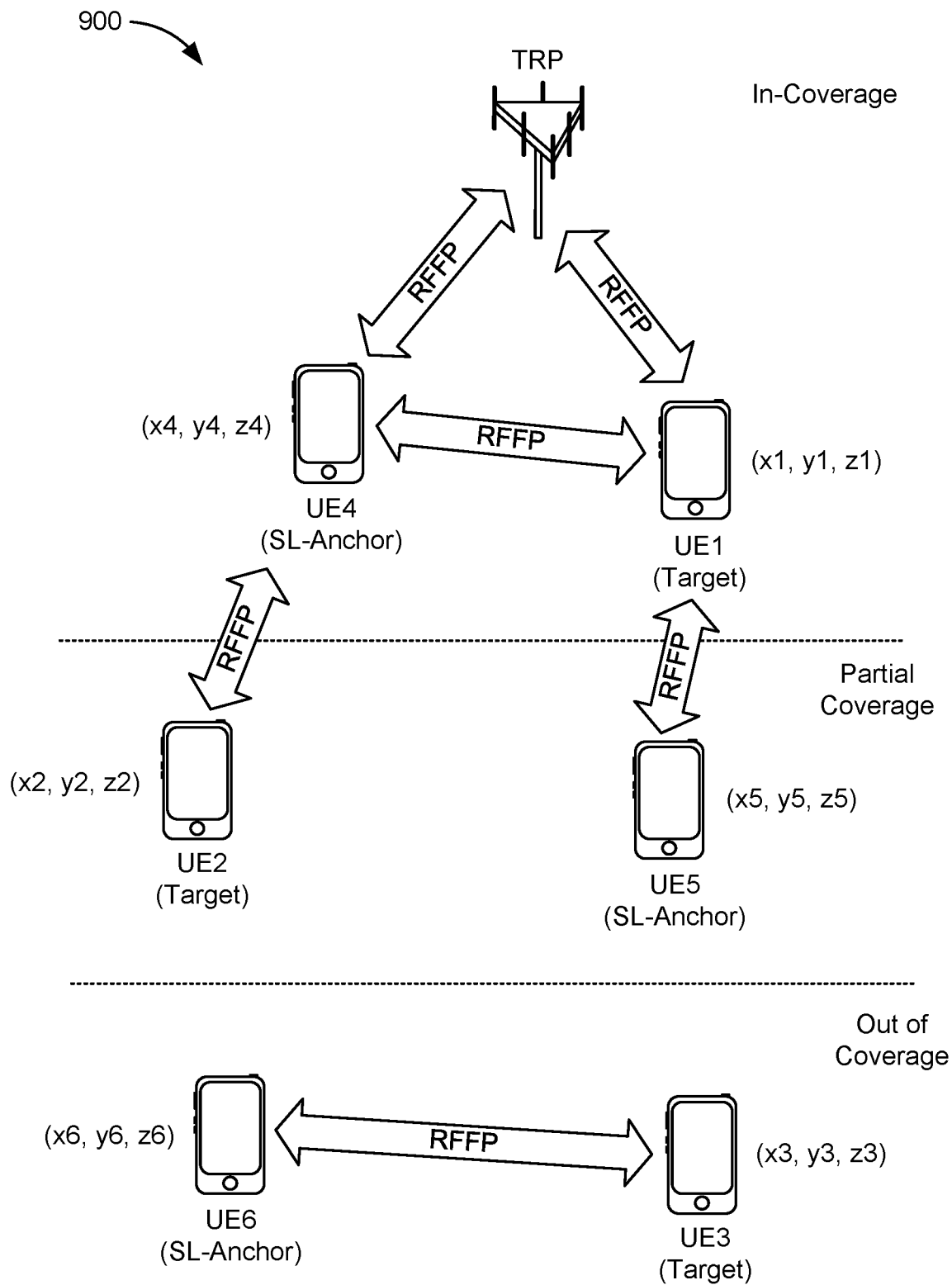
FIG. 9 is a diagram illustrating the classification of UEs from a sidelink positioning perspective, according to aspects of the disclosure.

FIG. 9 is a diagram 900 illustrating the classification of UEs from a sidelink positioning perspective, according to aspects of the disclosure. A UE to be positioned is referred to as a "target UE" and UEs offering support over a sidelink (SL) connection are referred to as "SL-anchors." A target UE can be classified based on network coverage as (1) an in-coverage (InC) target UE (e.g., "UE1"), (2) a partial-coverage (PrC) target UE (e.g., "UE2"), or (3) an out-of-coverage (OoC) target UE (e.g., "UE3"). Similarly, a SL-anchor UE can be classified based on network coverage as (1) an in-coverage (InC) SL-anchor UE (e.g., "UE4"), (2) a partial-coverage (PrC) SL-anchor UE (e.g., "UE5"), or (3) an out-of-coverage (OoC) SL-anchor UE (e.g., "UE6").

Note that a SL anchor UE may be mobile or fixed, but should generally have a known location (although this is not necessary, it may instead simply participate in a ranging session with the target UE to enable the target UE to determine the relative distance to the anchor UE). In addition, a fixed SL anchor UE may be more capable than a mobile anchor UE (e.g., an RSU) due, for example, to having a wired power supply versus a batter power supply.

Figure 10:
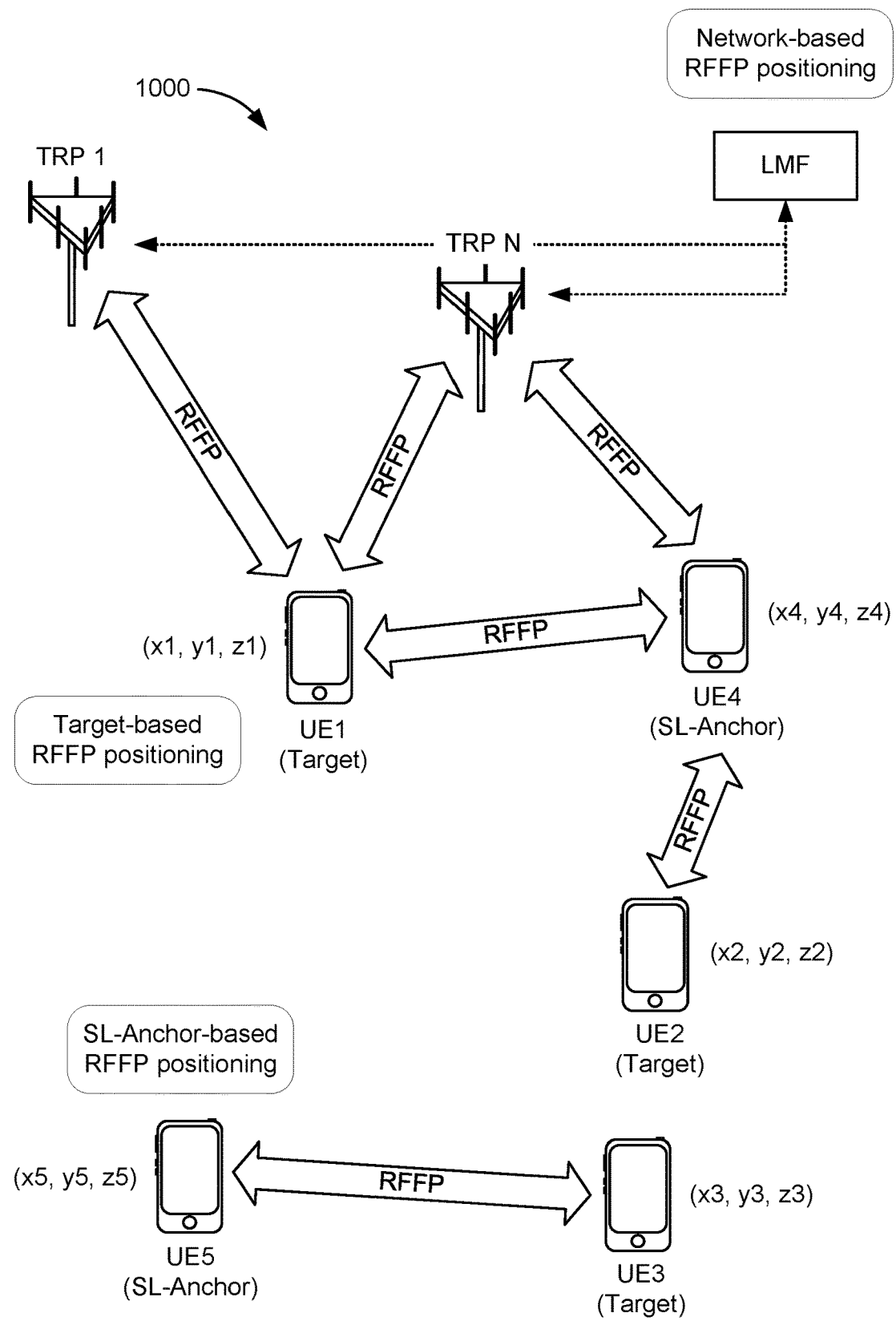
FIG. 10 is a diagram illustrating examples of different sidelink-aware RFFP-based positioning modes, according to aspects of the disclosure.

FIG. 10 is a diagram 1000 illustrating examples of different sidelink-aware RFFP-based positioning modes, according to aspects of the disclosure. In a sidelink-aware network-based RFFP-based positioning mode, the inference (i.e., the prediction of a target UE's location) is made by the network (e.g., an LMF). Sidelink communications among target and anchor UEs provide assisting features to position a target UE. The target UE can be InC or PrC, and may have limited training/inference capabilities. The present disclosure focuses primarily on sidelink-aware network-based RFFP-based positioning.

In a sidelink-aware SL-anchor-based RFFP-based positioning mode, the inference is made at a SL-anchor UE (whether a fixed or mobile SL-anchor UE). The target UE can be InC or PrC, and may have limited training/inference capabilities. In a sidelink-aware target UE-based RFFP-based positioning mode, the inference is made at the target UE. The target UE can be InC or PrC and, in contrast to the other two modes, has strong training/inference capabilities.

The sidelink-aware network-based RFFP-based positioning mode can be sub-divided into additional modes. In a first mode, referred to as "Mode A," both the training of the machine learning model and the inference of the target UE's location are performed by the network (i.e., network-based training and inference). In a second mode, referred to as "Mode B," the target UE trains the machine learning model and the network infers the target UE's location (i.e., target UE-based training and network-based inference). In a third mode, referred to as "Mode C," a SL-anchor UE trains the machine learning model and the network infers the target UE's location (i.e., SL-anchor-based training and network-based inference).

Figure 11:
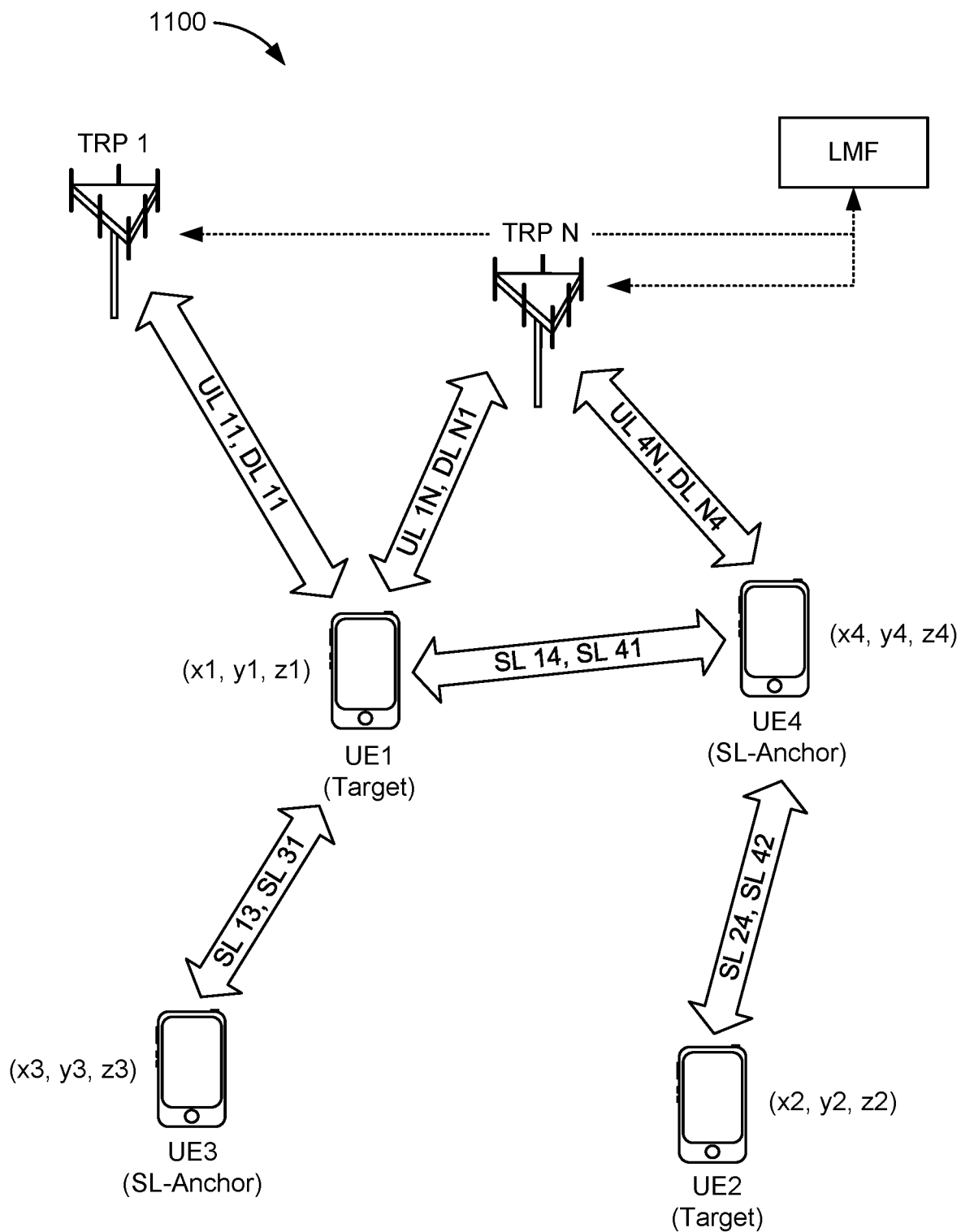
FIG. 11 is a diagram illustrating examples of different sources of RFFPs, according to aspects of the disclosure.

FIG. 11 is a diagram 1100 illustrating examples of different sources of RFFPs, according to aspects of the disclosure. As shown in FIG. 11, there may be one or more uplink channels and/or one or more downlink channels between TRP 1 and UE 1 (labeled "UL 11, DL 11"). Similarly, there may be one or more uplink channels and/or one or more downlink channels between TRP N and UE 1 (labeled "UL 1N, DL N1"). Further, there may be one or more uplink channels and/or one or more downlink channels between TRP N and UE 4 (labeled "UL 4N, DL N4"). There may also be one or more sidelink channels between UE1 and UE4 (labeled "SL 14, SL 41"), between UE1 and UE3 (labeled "SL 13, SL 31"), and between UE4 and UE2 (labeled "SL 24, SL 42").

Each of these channels (or links) may be associated with an RFFP. For example, TRP N may determine the RFFPs (e.g., CERs/CIRs/CFRs) of the uplink channels between itself and UE1 and UE4. Similarly, UE1 may determine the RFFPs (e.g., CERs/CIRs/CFRs) of the downlink channels between itself and TRP 1 and TRP N. The UE1 may also determine the RFFPs for the sidelink channels between itself and UE3 and UE4. Similarly, UE4 may determine the RFFPs (e.g., CERs/CIRs) of the sidelink channels between itself and UE1 and UE2. The other illustrated devices may similarly determine RFFPs of the channel(s) received/measured at those devices.

Figure 12:
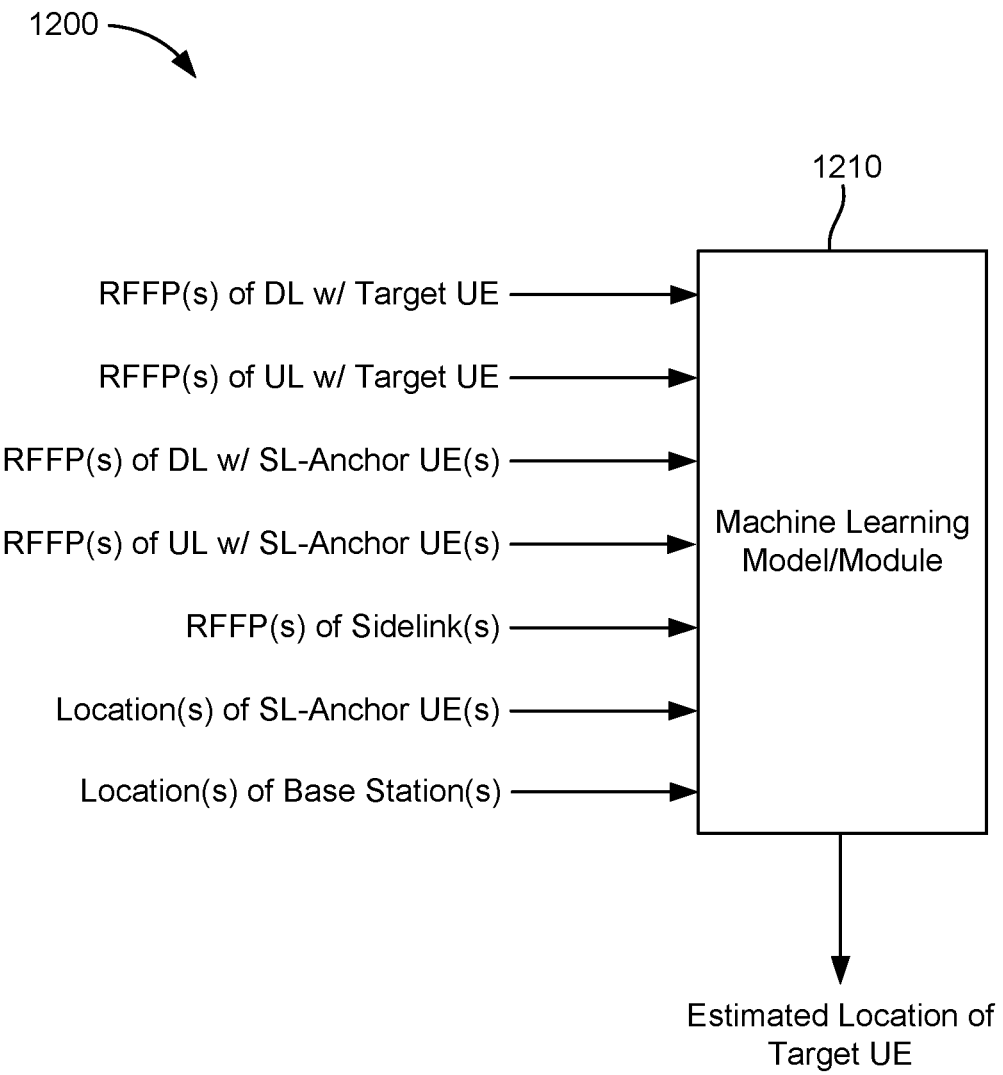
FIG. 12 is a diagram illustrating various inputs to a machine learning model/module for predicting the location of a target UE using RFFPs, according to aspects of the disclosure.

FIG. 12 is a diagram 1200 illustrating various inputs to a machine learning model/module 1210 for predicting the location of a target UE using RFFPs, according to aspects of the disclosure. The illustrated machine learning model/module 1210 may be any type of neural network or machine learning model/module. As shown in FIG. 12, the inputs may include the RFFPs of downlink (DL) channels received at the target UE (e.g., DL 11 and DL N1 in FIG. 11), the RFFPs of uplink (UL) channels received from the target UE (e.g., UL 11, UL 1N in FIG. 11), the RFFPs of downlink (DL) channels received at any SL-anchor UEs (e.g., DL N4 in FIG. 11), the RFFPs of uplink (UL) channels received from any SL-anchor UEs (e.g., UL 4N in FIG. 11), the RFFPs of any sidelinks, whether between two SL-anchor UEs or a SL-anchor UE and the target UE (e.g., in FIG. 11, SL 13 received at UE 3, SL 31 and SL 41 received at UE1, SL 14 and SL 24 received at UE4, and SL 42 received at UE2), the locations of any SL-anchor UEs reporting measured RFFPs, and the locations of any base stations reporting measured RFFPs.

Based on these inputs, the machine learning model/module 1210 outputs the estimated location of the target UE. Note that some of the inputs shown in FIG. 12 are optional and depend on coverage (e.g., there may be no uplink and/or downlink channels) and allowed complexity.

Training a machine learning model for sidelink-aware RFFP-based positioning (e.g., machine learning model/module 1210) can start with a unified network-wide pre-trained machine learning model that can be fine-tuned to meet specific scenarios and device types. That is, the location server may collect RFFPs from UEs (both target and anchor), base stations, and other network nodes across the network to pre-train the machine learning model. The pre-training here is like regular training; it simply indicates that the machine learning model parameters can be initiated to non-random values, which makes training or tuning in the scenario of interest much easier and faster. The machine learning model parameters can be initiated to values that are known to produce good positioning in different regions/scenarios. The pre-trained machine learning model can then be tailored to specific scenarios and/or UEs. The pre-trained model can be stored at the location server (or other network entity) and/or shared with target UEs and/or SL-anchor UEs as a sidelink-related SIB configuration.

Regarding the data collection for training and inference in greater detail, as a first option, a base station may measure the RFFPs of uplink channels (e.g., UL 1N, UL 4N in FIG. 11) from a target UE and SL-anchor UEs (if any) based on the reception of, for example, UL-SRS over Uu links. The base station may also request, from the target UE and SL-anchor UEs, measurement reports of RFFPs based on SL-PRS exchanged over PC5 links (e.g., SL 13, SL 31, SL 14, SL 41, SL 24, SL 42 in FIG. 11). The base station may then forward this information to the location server (e.g., LMF 270) via, for example, New Radio positioning protocol type A (NRPPa). Alternatively, the location server may request the measurement reports directly from the UEs via, for example, LTE positioning protocol (LPP).

As a second option, a base station may request measurement reports from the target UE and SL-anchor UEs of RFFPs based on DL-PRS sent over Uu links (e.g., DL N1, DL N4 in FIG. 11) and of RFFPs based on SL-PRS exchanged over PC5 links. The base station may then forward this information to the location server via, for example, NRPPa. Alternatively, the location server may request the measurement reports directly from the UEs via, for example, LPP. Using RFFPs of DL-PRS is beneficial because DL-PRS can have a larger bandwidth than SRS and therefore support higher accuracy.

For the two options described above, InC SL-anchor UEs (e.g., UE4 in FIG. 9) measure RFFPs and/or forward measurement reports from any PrC target UEs (e.g., UE2 in FIG. 9) to the location server. Similarly, an InC target UE (e.g., UE1 in FIG. 9) measures RFFPs and/or forwards measurement reports from any PrC SL-anchor UEs (e.g., UE5 in FIG. 9) to the location server.

Referring to Mode A sidelink-aware network-based RFFP-based positioning (i.e., network-based training and inference), as a first stage, the location server (or other network entity) requests any available training data (e.g., RFFPs) from any base stations, SL-anchor UEs, and target UEs in its coverage area (e.g., TRP 1, TRP N, UE1, UE2, UE4 in FIG. 10, TRP 1, TRP N, UE1, UE2, UE3, UE4 in FIG. 11). At a second stage, the location server trains a machine learning model (or fine-tunes an existing model) to perform sidelink-aware RFFP-based positioning. At a third stage, at inference time (e.g., upon reception of a request to determine the location of a target UE (e.g., from the target UE, a network entity, a third-party application, etc.), such as during an LPP positioning session), the location server collects applicable observed measurements/measurement reports (e.g., DL RFFPs if the target UE is receiving at least one downlink channel, SL RFFPs if the target UE is receiving at least one sidelink channel, etc.) and infers the location of the target UE using the trained machine learning model.

Referring to Mode B sidelink-aware network-based RFFP-based positioning (i.e., target UE-based training and network-based inference), at a first stage, the target UE measures and collects available training data (e.g., RFFPs) from any involved base stations and SL-anchor UEs. At a second stage, the target UE trains a machine learning model (or fine-tunes an existing model) to perform sidelink-aware RFFP-based positioning. At a third stage, the target UE sends the trained machine learning model to the location server. At a fourth stage, at inference time (e.g., upon reception of a request to determine the location of a target UE, such as during an LPP positioning session), the location server collects applicable observed measurements/measurement reports (e.g., DL RFFPs if the target UE is receiving at least one downlink channel, SL RFFPs if the target UE is receiving at least one sidelink channel, etc.) from any involved base stations, target UEs, and SL-anchor UEs and infers the location of the target UE using the measurements and optionally an updated version of the trained machine learning model from the third stage.

As an example of updating the machine learning model at the network side after being trained by a target UE or a SL-anchor UE, the network can collect additional measurements and update the UE-trained model (e.g., to account for dynamic changes in wireless environment). As another example, the network can aggregate (e.g., average) multiple machine learning models trained by different UEs to construct a "super" machine learning model (similar to federated/distributed learning). As will be appreciated, other examples are possible.

Referring to Mode C sidelink-aware network-based RFFP-based positioning (i.e., SL-anchor UE based training and network-based inference), at a first stage, a SL-anchor UE measures and collects available training data (e.g., RFFPs) from any involved base stations and target UEs. At a second stage, the SL-anchor UE trains a machine learning model (or fine-tunes an existing model) to perform sidelink-aware RFFP-based positioning. At a third stage, the SL-anchor UE sends the trained machine learning model to the location server. At a fourth stage, at inference time (e.g., upon reception of a request to determine the location of a target UE, such as during an LPP positioning session), the location server collects applicable observed measurements/measurement reports (e.g., DL RFFPs if the target UE is receiving at least one downlink channel, SL RFFPs if the target UE is receiving at least one sidelink channel, etc.) from any involved base stations, target UEs, and SL-anchor UEs and infers the location of the target UE using the measurements and optionally an updated version of the trained machine learning model from the third stage.

UE-based training and network-based inference, as in Mode B and Mode C, can be beneficial for constructing a unified network-wide machine learning model that can be updated using federated learning or fine-tuning (e.g., model transfer) approaches. That is, each UE in a network may obtain training data (e.g., downlink and sidelink RFFPs) and train its own machine learning model. The location server can then aggregate the individual machine learning models into a unified network-wide machine learning model. At inference time, the network-wide machine learning model can be adapted for specific scenarios and/or the specific target UE.

Figure 13:
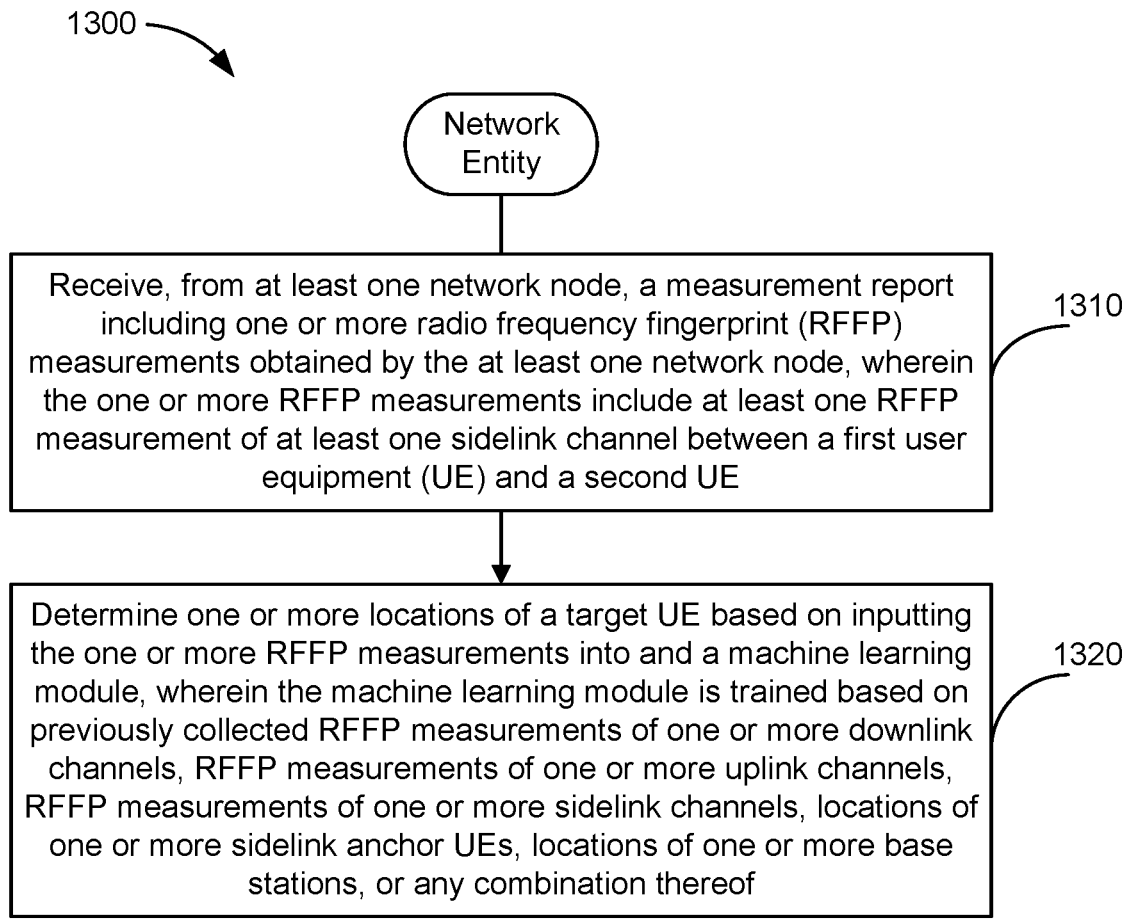
FIGS. 13 to 14 illustrate example methods of positioning, according to aspects of the disclosure.

FIG. 13 illustrates an example method 1300 of positioning, according to aspects of the disclosure. In an aspect, method 1300 may be performed by a network entity (e.g., an LMF 270 or other network entity).

At 1310, the network entity receives, from at least one network node (e.g., a target UE, an SL-anchor UE, a base station), a measurement report including one or more RFFP measurements obtained by the at least one network node, wherein the one or more RFFP measurements include at least one RFFP measurement of at least one sidelink channel between a first UE and a second UE. In an aspect, operation 1310 may be performed by the one or more network transceivers 390, the one or more processors 394, memory 396, and/or positioning component 398, any or all of which may be considered means for performing this operation.

At 1320, the network entity determines one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof. In an aspect, operation 1320 may be performed by the one or more network transceivers 390, the one or more processors 394, memory 396, and/or positioning component 398, any or all of which may be considered means for performing this operation.

Figure 14:
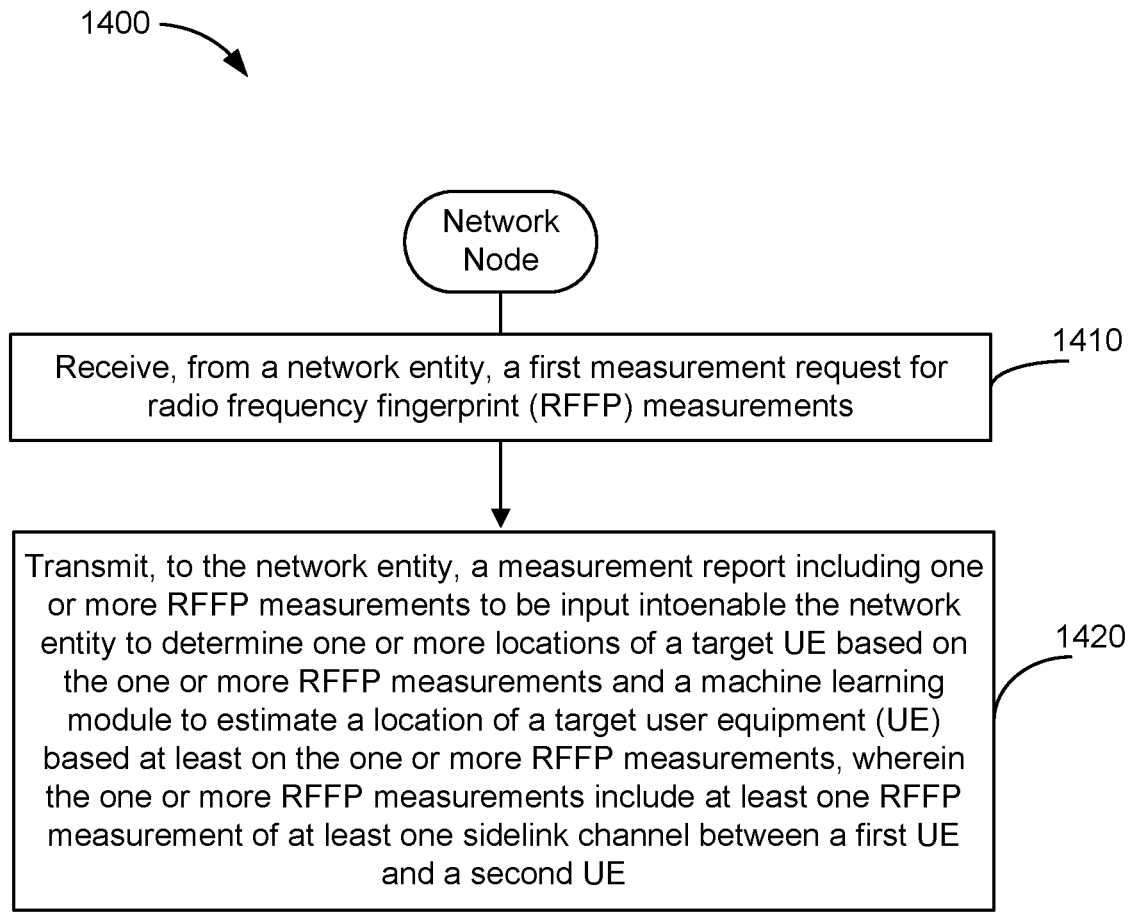

FIG. 14 illustrates an example method 1400 of positioning, according to aspects of the disclosure. In an aspect, method 1400 may be performed by a network node (e.g., any of the UEs or base stations described herein).

At 1410, the network node receives, from a network entity (e.g., LMF 270), a first measurement request for RFFP measurements. In an aspect, where the network node is a UE, operation 1410 may be performed by the one or more WWAN transceivers 310, the one or more processors 332, memory 340, and/or positioning component 342, any or all of which may be considered means for performing this operation. In an aspect, where the network node is a base station, operation 1410 may be performed by the one or more WWAN transceivers 350, the one or more network transceivers 360, the one or more processors 384, memory 386, and/or positioning component 388, any or all of which may be considered means for performing this operation.

At 1420, the network transmits, to the network entity, a measurement report including one or more RFFP measurements to enable the network entity to determine one or more locations of a target UE based on the one or more RFFP measurements and a machine learning module, wherein the one or more RFFP measurements include at least one RFFP measurement of at least one sidelink channel between a first UE and a second UE. In an aspect, as described herein, the network node can train the machine learning module itself and report the trained machine learning module to the network entity before transmitting the measurement report to the network entity to perform the inference. In an aspect, where the network node is a UE, operation 1410 may be performed by the one or more WWAN transceivers 310, the one or more processors 332, memory 340, and/or positioning component 342, any or all of which may be considered means for performing this operation. In an aspect, where the network node is a base station, operation 1410 may be performed by the one or more WWAN transceivers 350, the one or more network transceivers 360, the one or more processors 384, memory 386, and/or positioning component 388, any or all of which may be considered means for performing this operation.

As will be appreciated, a technical advantage of the methods 1300 and 1400 is enabling the use of machine learning for sidelink-aware RFFP-based positioning.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of positioning performed by a network entity, comprising: receiving, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and determining one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

Clause 2. The method of clause 1, further comprising: receiving the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and training the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 3. The method of clause 2, further comprising: transmitting measurement report requests for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 4. The method of clause 3, wherein: the measurement report requests are transmitted to the target UE, the one or more sidelink anchor UEs, the one or more base stations, or any combination thereof, and the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof are received from the target UE, the one or more sidelink anchor UEs, the one or more base stations, or the combination thereof.

Clause 5. The method of any of clauses 1 to 4, further comprising: transmitting a request for the measurement report to the at least one network node during a positioning session between the target UE and the network entity.

Clause 6. The method of any of clauses 1 to 5, wherein the machine learning module is trained by the target UE or a sidelink anchor UE using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 7. The method of clause 6, further comprising: receiving the machine learning module from the target UE or the sidelink anchor UE.

Clause 8. The method of clause 7, further comprising: updating the machine learning module after reception of the machine learning module and before the one or more RFFP measurements are input into the machine learning module.

Clause 9. The method of any of clauses 1 to 8, wherein: the one or more downlink channels are between the one or more base stations and the target UE, the one or more sidelink anchor UEs, or both, the one or more uplink channels are between the one or more base stations and the target UE, the one or more sidelink anchor UEs, or both, and the one or more sidelink channels are between the target UE and the one or more sidelink anchor UEs, between the one or more sidelink anchor UEs, or both.

Clause 10. The method of any of clauses 1 to 9, wherein the at least one network node is: the target UE, the first UE, the second UE, a base station serving the target UE, or a sidelink anchor UE.

Clause 11. The method of any of clauses 1 to 10, wherein the first UE and the second UE are: the target UE and a sidelink anchor UE, or a first sidelink anchor UE and a second sidelink anchor UE.

Clause 12. The method of any of clauses 1 to 11, wherein the network entity is a location server.

Clause 13. A method of positioning performed by a network node, comprising: receiving, from a network entity, a first measurement request for radio frequency fingerprint (RFFP) measurements; and transmitting, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

Clause 14. The method of clause 13, further comprising: obtaining RFFP measurements of one or more downlink channels, RFFP measurements of one or more uplink channels, RFFP measurements of one or more sidelink channels, locations of one or more sidelink anchor UEs, locations of one or more base stations, or any combination thereof.

Clause 15. The method of clause 14, wherein: the one or more downlink channels are between the one or more base stations and the target UE, the one or more sidelink anchor UEs, or both, the one or more uplink channels are between the one or more base stations and the target UE, the one or more sidelink anchor UEs, or both, and the one or more sidelink channels are between the target UE and the one or more sidelink anchor UEs, between the one or more sidelink anchor UEs, or both.

Clause 16. The method of any of clauses 14 to 15, further comprising: training the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and transmitting the machine learning module to the network entity.

Clause 17. The method of any of clauses 14 to 16, further comprising: transmitting, to the network entity, the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof to enable the network entity to train the machine learning module.

Clause 18. The method of any of clauses 16 to 17, further comprising: receiving, from the network entity, a second measurement request for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 19. The method of any of clauses 14 to 18, wherein: the RFFP measurements of the one or more downlink channels are measured by the network node, obtained from the target UE, obtained from the one or more sidelink anchor UEs, or any combination thereof, and the RFFP measurements of the one or more sidelink channels are measured by the network node, obtained from the target UE, obtained from the one or more sidelink anchor UEs, or any combination thereof.

Clause 20. The method of any of clauses 14 to 19, wherein: the RFFP measurements of the one or more uplink channels are measured by the network node, obtained from the one or more base stations, or both.

Clause 21. The method of any of clauses 13 to 20, wherein the network node is: the target UE, the first UE, the second UE, a base station serving the target UE, or a sidelink anchor UE.

Clause 22. The method of any of clauses 13 to 21, wherein the first UE and the second UE are: the target UE and a sidelink anchor UE, or a first sidelink anchor UE and a second sidelink anchor UE.

Clause 23. The method of any of clauses 13 to 22, wherein the network entity is a location server.

Clause 24. A network entity, comprising: a memory; at least one transceiver; and at least one processor communicatively coupled to the memory and the at least one transceiver, the at least one processor configured to: receive, via the at least one transceiver, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and determine one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

Clause 25. The network entity of clause 24, wherein the at least one processor is further configured to: receive, via the at least one transceiver, the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and train the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 26. The network entity of clause 25, wherein the at least one processor is further configured to: transmit, via the at least one transceiver, measurement report requests for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 27. The network entity of clause 26, wherein: the measurement report requests are transmitted to the target UE, the one or more sidelink anchor UEs, the one or more base stations, or any combination thereof, and the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof are received from the target UE, the one or more sidelink anchor UEs, the one or more base stations, or the combination thereof.

Clause 28. The network entity of any of clauses 24 to 27, wherein the at least one processor is further configured to: transmit, via the at least one transceiver, a request for the measurement report to the at least one network node during a positioning session between the target UE and the network entity.

Clause 29. The network entity of any of clauses 24 to 28, wherein the machine learning module is trained by the target UE or a sidelink anchor UE using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 30. The network entity of clause 29, wherein the at least one processor is further configured to: receive, via the at least one transceiver, the machine learning module from the target UE or the sidelink anchor UE.

Clause 31. The network entity of clause 30, wherein the at least one processor is further configured to: update the machine learning module after reception of the machine learning module and before the one or more RFFP measurements are input into the machine learning module.

Clause 32. The network entity of any of clauses 24 to 31, wherein: the one or more downlink channels are between the one or more base stations and the target UE, the one or more sidelink anchor UEs, or both, the one or more uplink channels are between the one or more base stations and the target UE, the one or more sidelink anchor UEs, or both, and the one or more sidelink channels are between the target UE and the one or more sidelink anchor UEs, between the one or more sidelink anchor UEs, or both.

Clause 33. The network entity of any of clauses 24 to 32, wherein the at least one network node is: the target UE, the first UE, the second UE, a base station serving the target UE, or a sidelink anchor UE.

Clause 34. The network entity of any of clauses 24 to 33, wherein the first UE and the second UE are: the target UE and a sidelink anchor UE, or a first sidelink anchor UE and a second sidelink anchor UE.

Clause 35. The network entity of any of clauses 24 to 34, wherein the network entity is a location server.

Clause 36. A network node, comprising: a memory; at least one transceiver; and at least one processor communicatively coupled to the memory and the at least one transceiver, the at least one processor configured to: receive, via the at least one transceiver, from a network entity, a first measurement request for radio frequency fingerprint (RFFP) measurements; and transmit, via the at least one transceiver, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

Clause 37. The network node of clause 36, wherein the at least one processor is further configured to: obtain RFFP measurements of one or more downlink channels, RFFP measurements of one or more uplink channels, RFFP measurements of one or more sidelink channels, locations of one or more sidelink anchor UEs, locations of one or more base stations, or any combination thereof.

Clause 38. The network node of clause 37, wherein: the one or more downlink channels are between the one or more base stations and the target UE, the one or more sidelink anchor UEs, or both, the one or more uplink channels are between the one or more base stations and the target UE, the one or more sidelink anchor UEs, or both, and the one or more sidelink channels are between the target UE and the one or more sidelink anchor UEs, between the one or more sidelink anchor UEs, or both.

Clause 39. The network node of any of clauses 37 to 38, wherein the at least one processor is further configured to: train the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and transmit, via the at least one transceiver, the machine learning module to the network entity.

Clause 40. The network node of any of clauses 37 to 39, wherein the at least one processor is further configured to: transmit, via the at least one transceiver, to the network entity, the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof to enable the network entity to train the machine learning module.

Clause 41. The network node of any of clauses 39 to 40, wherein the at least one processor is further configured to: receive, via the at least one transceiver, from the network entity, a second measurement request for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 42. The network node of any of clauses 37 to 41, wherein: the RFFP measurements of the one or more downlink channels are measured by the network node, obtained from the target UE, obtained from the one or more sidelink anchor UEs, or any combination thereof, and the RFFP measurements of the one or more sidelink channels are measured by the network node, obtained from the target UE, obtained from the one or more sidelink anchor UEs, or any combination thereof.

Clause 43. The network node of any of clauses 37 to 42, wherein: the RFFP measurements of the one or more uplink channels are measured by the network node, obtained from the one or more base stations, or both.

Clause 44. The network node of any of clauses 36 to 43, wherein the network node is: the target UE, the first UE, the second UE, a base station serving the target UE, or a sidelink anchor UE.

Clause 45. The network node of any of clauses 36 to 44, wherein the first UE and the second UE are: the target UE and a sidelink anchor UE, or a first sidelink anchor UE and a second sidelink anchor UE.

Clause 46. The network node of any of clauses 36 to 45, wherein the network entity is a location server.

Clause 47. A network entity, comprising: means for receiving, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and means for determining one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

Clause 48. The network entity of clause 47, further comprising: means for receiving the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof and means for training the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 49. The network entity of clause 48, further comprising: means for transmitting measurement report requests for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 50. The network entity of clause 49, wherein: the measurement report requests are transmitted to the target UE, the one or more sidelink anchor UEs, the one or more base stations, or any combination thereof, and the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof are received from the target UE, the one or more sidelink anchor UEs, the one or more base stations, or the combination thereof.

Clause 51. The network entity of any of clauses 47 to 50, further comprising: means for transmitting a request for the measurement report to the at least one network node during a positioning session between the target UE and the network entity.

Clause 52. The network entity of any of clauses 47 to 51, wherein the machine learning module is trained by the target UE or a sidelink anchor UE using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 53. The network entity of clause 52, further comprising: means for receiving the machine learning module from the target UE or the sidelink anchor UE.

Clause 54. The network entity of clause 53, further comprising: means for updating the machine learning module after reception of the machine learning module and before the one or more RFFP measurements are input into the machine learning module.

Clause 55. The network entity of any of clauses 47 to 54, wherein: the one or more downlink channels are between the one or more base stations and the target UE, the one or more sidelink anchor UEs, or both, the one or more uplink channels are between the one or more base stations and the target UE, the one or more sidelink anchor UEs, or both, and the one or more sidelink channels are between the target UE and the one or more sidelink anchor UEs, between the one or more sidelink anchor UEs, or both.

Clause 56. The network entity of any of clauses 47 to 55, wherein the at least one network node is: the target UE, the first UE, the second UE, a base station serving the target UE, or a sidelink anchor UE.

Clause 57. The network entity of any of clauses 47 to 56, wherein the first UE and the second UE are: the target UE and a sidelink anchor UE, or a first sidelink anchor UE and a second sidelink anchor UE.

Clause 58. The network entity of any of clauses 47 to 57, wherein the network entity is a location server.

Clause 59. A network node, comprising: means for receiving, from a network entity, a first measurement request for radio frequency fingerprint (RFFP) measurements; and means for transmitting, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

Clause 60. The network node of clause 59, further comprising: means for obtaining RFFP measurements of one or more downlink channels, RFFP measurements of one or more uplink channels, RFFP measurements of one or more sidelink channels, locations of one or more sidelink anchor UEs, locations of one or more base stations, or any combination thereof.

Clause 61. The network node of clause 60, wherein: the one or more downlink channels are between the one or more base stations and the target UE, the one or more sidelink anchor UEs, or both, the one or more uplink channels are between the one or more base stations and the target UE, the one or more sidelink anchor UEs, or both, and the one or more sidelink channels are between the target UE and the one or more sidelink anchor UEs, between the one or more sidelink anchor UEs, or both.

Clause 62. The network node of any of clauses 60 to 61, further comprising: means for training the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and means for transmitting the machine learning module to the network entity.

Clause 63. The network node of any of clauses 60 to 62, further comprising: means for transmitting, to the network entity, the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof to enable the network entity to train the machine learning module.

Clause 64. The network node of any of clauses 62 to 63, further comprising: means for receiving, from the network entity, a second measurement request for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 65. The network node of any of clauses 60 to 64, wherein: the RFFP measurements of the one or more downlink channels are measured by the network node, obtained from the target UE, obtained from the one or more sidelink anchor UEs, or any combination thereof, and the RFFP measurements of the one or more sidelink channels are measured by the network node, obtained from the target UE, obtained from the one or more sidelink anchor UEs, or any combination thereof.

Clause 66. The network node of any of clauses 60 to 65, wherein: the RFFP measurements of the one or more uplink channels are measured by the network node, obtained from the one or more base stations, or both.

Clause 67. The network node of any of clauses 59 to 66, wherein the network node is: the target UE, the first UE, the second UE, a base station serving the target UE, or a sidelink anchor UE.

Clause 68. The network node of any of clauses 59 to 67, wherein the first UE and the second UE are: the target UE and a sidelink anchor UE, or a first sidelink anchor UE and a second sidelink anchor UE.

Clause 69. The network node of any of clauses 59 to 68, wherein the network entity is a location server.

Clause 70. A non-transitory computer-readable medium storing computer-executable instructions that, when executed by a network entity, cause the network entity to: receive, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and determine one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

Clause 71. The non-transitory computer-readable medium of clause 70, further comprising computer-executable instructions that, when executed by the network entity, cause the network entity to: receive the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and train the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 72. The non-transitory computer-readable medium of clause 71, further comprising computer-executable instructions that, when executed by the network entity, cause the network entity to: transmit measurement report requests for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 73. The non-transitory computer-readable medium of clause 72, wherein: the measurement report requests are transmitted to the target UE, the one or more sidelink anchor UEs, the one or more base stations, or any combination thereof, and the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof are received from the target UE, the one or more sidelink anchor UEs, the one or more base stations, or the combination thereof.

Clause 74. The non-transitory computer-readable medium of any of clauses 70 to 73, further comprising computer-executable instructions that, when executed by the network entity, cause the network entity to: transmit a request for the measurement report to the at least one network node during a positioning session between the target UE and the network entity.

Clause 75. The non-transitory computer-readable medium of any of clauses 70 to 74, wherein the machine learning module is trained by the target UE or a sidelink anchor UE using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 76. The non-transitory computer-readable medium of clause 75, further comprising computer-executable instructions that, when executed by the network entity, cause the network entity to: receive the machine learning module from the target UE or the sidelink anchor UE.

Clause 77. The non-transitory computer-readable medium of clause 76, further comprising computer-executable instructions that, when executed by the network entity, cause the network entity to: update the machine learning module after reception of the machine learning module and before the one or more RFFP measurements are input into the machine learning module.

Clause 78. The non-transitory computer-readable medium of any of clauses 70 to 77, wherein: the one or more downlink channels are between the one or more base stations and the target UE, the one or more sidelink anchor UEs, or both, the one or more uplink channels are between the one or more base stations and the target UE, the one or more sidelink anchor UEs, or both, and the one or more sidelink channels are between the target UE and the one or more sidelink anchor UEs, between the one or more sidelink anchor UEs, or both.

Clause 79. The non-transitory computer-readable medium of any of clauses 70 to 78, wherein the at least one network node is: the target UE, the first UE, the second UE, a base station serving the target UE, or a sidelink anchor UE.

Clause 80. The non-transitory computer-readable medium of any of clauses 70 to 79, wherein the first UE and the second UE are: the target UE and a sidelink anchor UE, or a first sidelink anchor UE and a second sidelink anchor UE.

Clause 81. The non-transitory computer-readable medium of any of clauses 70 to 80, wherein the network entity is a location server.

Clause 82. A non-transitory computer-readable medium storing computer-executable instructions that, when executed by a network node, cause the network node to: receive, from a network entity, a first measurement request for radio frequency fingerprint (RFFP) measurements; and transmit, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

Clause 83. The non-transitory computer-readable medium of clause 82, further comprising computer-executable instructions that, when executed by the network node, cause the network node to: obtain RFFP measurements of one or more downlink channels, RFFP measurements of one or more uplink channels, RFFP measurements of one or more sidelink channels, locations of one or more sidelink anchor UEs, locations of one or more base stations, or any combination thereof.

Clause 84. The non-transitory computer-readable medium of clause 83, wherein: the one or more downlink channels are between the one or more base stations and the target UE, the one or more sidelink anchor UEs, or both, the one or more uplink channels are between the one or more base stations and the target UE, the one or more sidelink anchor UEs, or both, and the one or more sidelink channels are between the target UE and the one or more sidelink anchor UEs, between the one or more sidelink anchor UEs, or both.

Clause 85. The non-transitory computer-readable medium of any of clauses 83 to 84, further comprising computer-executable instructions that, when executed by the network node, cause the network node to: train the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and transmit the machine learning module to the network entity.

Clause 86. The non-transitory computer-readable medium of any of clauses 83 to 85, further comprising computer-executable instructions that, when executed by the network node, cause the network node to: transmit, to the network entity, the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof to enable the network entity to train the machine learning module.

Clause 87. The non-transitory computer-readable medium of any of clauses 85 to 86, further comprising computer-executable instructions that, when executed by the network node, cause the network node to: receive, from the network entity, a second measurement request for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

Clause 88. The non-transitory computer-readable medium of any of clauses 83 to 87, wherein: the RFFP measurements of the one or more downlink channels are measured by the network node, obtained from the target UE, obtained from the one or more sidelink anchor UEs, or any combination thereof, and the RFFP measurements of the one or more sidelink channels are measured by the network node, obtained from the target UE, obtained from the one or more sidelink anchor UEs, or any combination thereof.

Clause 89. The non-transitory computer-readable medium of any of clauses 83 to 88, wherein: the RFFP measurements of the one or more uplink channels are measured by the network node, obtained from the one or more base stations, or both.

Clause 90. The non-transitory computer-readable medium of any of clauses 82 to 89, wherein the network node is: the target UE, the first UE, the second UE, a base station serving the target UE, or a sidelink anchor UE.

Clause 91. The non-transitory computer-readable medium of any of clauses 82 to 90, wherein the first UE and the second UE are: the target UE and a sidelink anchor UE, or a first sidelink anchor UE and a second sidelink anchor UE.

Clause 92. The non-transitory computer-readable medium of any of clauses 82 to 91, wherein the network entity is a location server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of positioning performed by a network entity, comprising:
    receiving, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and
    determining one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

2. The method of claim 1, further comprising:
receiving the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and
training the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

3. The method of claim 2, further comprising:
transmitting measurement report requests for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

4. The method of claim 3, wherein:
the measurement report requests are transmitted to the target UE, the one or more sidelink anchor UEs, the one or more base stations, or any combination thereof, and
the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof are received from the target UE, the one or more sidelink anchor UEs, the one or more base stations, or the combination thereof.

5. The method of claim 1, further comprising:
transmitting a request for the measurement report to the at least one network node during a positioning session between the target UE and the network entity.

6. The method of claim 1, wherein the machine learning module is trained by the target UE or a sidelink anchor UE using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

7. The method of claim 6, further comprising:
receiving the machine learning module from the target UE or the sidelink anchor UE.

8. The method of claim 7, further comprising:
updating the machine learning module after reception of the machine learning module and before the one or more RFFP measurements are input into the machine learning module.

9. The method of claim 1, wherein:
the one or more downlink channels are between the one or more base stations and the target UE, the one or more sidelink anchor UEs, or both,
the one or more uplink channels are between the one or more base stations and the target UE, the one or more sidelink anchor UEs, or both, and
the one or more sidelink channels are between the target UE and the one or more sidelink anchor UEs, between the one or more sidelink anchor UEs, or both.

10. The method of claim 1, wherein the at least one network node is:
the target UE,
the first UE,
the second UE,
a base station serving the target UE, or
a sidelink anchor UE.

11. The method of claim 1, wherein the first UE and the second UE are:
the target UE and a sidelink anchor UE, or
a first sidelink anchor UE and a second sidelink anchor UE.

12. The method of claim 1, wherein the network entity is a location server.

13. A method of positioning performed by a network node, comprising:
receiving, from a network entity, a first measurement request for radio frequency fingerprint (RFFP) measurements; and
transmitting, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

14. The method of claim 13, further comprising:
obtaining RFFP measurements of one or more downlink channels, RFFP measurements of one or more uplink channels, RFFP measurements of one or more sidelink channels, locations of one or more sidelink anchor UEs, locations of one or more base stations, or any combination thereof.

15. The method of claim 14, wherein:
the one or more downlink channels are between the one or more base stations and the target UE, the one or more sidelink anchor UEs, or both,
the one or more uplink channels are between the one or more base stations and the target UE, the one or more sidelink anchor UEs, or both, and
the one or more sidelink channels are between the target UE and the one or more sidelink anchor UEs, between the one or more sidelink anchor UEs, or both.

16. The method of claim 14, further comprising:
training the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and
transmitting the machine learning module to the network entity.

17. The method of claim 14, further comprising:
transmitting, to the network entity, the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof to enable the network entity to train the machine learning module.

18. The method of claim 16, further comprising:
receiving, from the network entity, a second measurement request for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

19. The method of claim 14, wherein:
the RFFP measurements of the one or more downlink channels are measured by the network node, obtained from the target UE, obtained from the one or more sidelink anchor UEs, or any combination thereof, and
the RFFP measurements of the one or more sidelink channels are measured by the network node, obtained from the target UE, obtained from the one or more sidelink anchor UEs, or any combination thereof.

20. The method of claim 14, wherein:
the RFFP measurements of the one or more uplink channels are measured by the network node, obtained from the one or more base stations, or both.

21. The method of claim 13, wherein the network node is:
the target UE,
the first UE,
the second UE,
a base station serving the target UE, or
a sidelink anchor UE.

22. The method of claim 13, wherein the first UE and the second UE are:
the target UE and a sidelink anchor UE, or
a first sidelink anchor UE and a second sidelink anchor UE.

23. The method of claim 13, wherein the network entity is a location server.

24. A network entity, comprising:
one or more memories;
one or more transceivers; and
one or more processors communicatively coupled to the one or more memories and the one or more transceivers, the one or more processors configured to:
receive, via the one or more transceivers, from at least one network node, a measurement report including one or more radio frequency fingerprint (RFFP) measurements obtained by the at least one network node, wherein the one or more RFFP measurements include at least one RFFP measurement of at least one sidelink channel between a first user equipment (UE) and a second UE; and
determine one or more locations of a target UE based on the one or more RFFP measurements and a machine learning module, wherein the machine learning module is trained based on previously collected RFFP measurements of one or more downlink channels, RFFP measurements of one or more uplink channels, RFFP measurements of one or more sidelink channels, locations of one or more sidelink anchor UEs, locations of one or more base stations, or any combination thereof.

25. The network entity of claim 24, wherein the at least one or more processors are further configured to:
receive, via the one or more transceivers, the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and train the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

26. The network entity of claim 25, wherein the one or more processors are further configured to:
transmit, via the one or more transceivers, measurement report requests for the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof.

27. The network entity of claim 24, wherein the one processor is further configured to:
receive, via the one or more transceivers, the machine learning module from the target UE or the sidelink anchor UE.

28. A network node, comprising:
one or more memories;
one or more transceivers; and
one or more processors communicatively coupled to the one or more memories and the one or more transceivers, the one or more processors configured to:
receive, via the one or more transceivers, from a network entity, a first measurement request for radio frequency fingerprint (RFFP) measurements; and
transmit, via the one or more transceivers, to the network entity, a measurement report including one or more RFFP measurements to enable the network entity to determine one or more locations of a target user equipment (UE) based on the one or more RFFP measurements and a machine learning module, wherein the one or more RFFP measurements include at least one RFFP measurement of at least one sidelink channel between a first UE and a second UE.

29. The network node of claim 28, wherein the one or more processors are further configured to:
obtain RFFP measurements of one or more downlink channels, RFFP measurements of one or more uplink channels, RFFP measurements of one or more sidelink channels, locations of one or more sidelink anchor UEs, locations of one or more base stations, or any combination thereof.

30. The network node of claim 29, wherein the one or more processors are further configured to:
train the machine learning module using the RFFP measurements of the one or more downlink channels, the RFFP measurements of the one or more uplink channels, the RFFP measurements of the one or more sidelink channels, the locations of the one or more sidelink anchor UEs, the locations of the one or more base stations, or the combination thereof; and
transmit, via the one or more transceivers, the machine learning module to the network entity.

\* \* \* \* \*